US011979356B2

(12) United States Patent
Liu et al.

(10) Patent No.: US 11,979,356 B2
(45) Date of Patent: May 7, 2024

(54) METHOD AND DEVICE IN NODE FOR WIRELESS COMMUNICATION

(71) Applicants: Zheng Liu, Shanghai (CN); Xiaobo Zhang, Shanghai (CN); Lin Yang, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/217,602

(22) Filed: Jul. 2, 2023

(65) Prior Publication Data

US 2023/0353329 A1    Nov. 2, 2023

Related U.S. Application Data

(63) Continuation of application No. 17/967,861, filed on Oct. 17, 2022, now Pat. No. 11,777,692, which is a
(Continued)

(30) Foreign Application Priority Data

Jul. 30, 2018    (CN) .......................... 201810852866.3

(51) Int. Cl.
*H04L 5/00*    (2006.01)
*H04W 4/40*    (2018.01)
(Continued)

(52) U.S. Cl.
CPC .......... *H04L 5/0082* (2013.01); *H04L 5/0094* (2013.01); *H04W 4/40* (2018.02);
(Continued)

(58) Field of Classification Search
CPC ...... H04L 5/0082; H04L 5/0094; H04W 4/40; H04W 24/08; H04W 72/0446; H04W 72/0453
See application file for complete search history.

(56) References Cited

U.S. PATENT DOCUMENTS

| 2019/0261337 A1 | 8/2019 | Park |
| 2020/0154481 A1 | 5/2020 | Gotol |
| 2020/0287691 A1 | 9/2020 | Baldemair |

FOREIGN PATENT DOCUMENTS

| CN | 106793127 A | 5/2017 |
| CN | 107396442 A | 11/2017 |

(Continued)

OTHER PUBLICATIONS

CN 1st Office Action received in application No. 201810852866.3 dated May 22, 2020.
(Continued)

*Primary Examiner* — Brian P Cox

(57) ABSTRACT

The disclosure provides a method and a device in a communication node for wireless communication. The communication node first receives first information and second information, and then transmits a first radio signal in W1 time sub-window(s); the first information is used for determining X candidate time window(s), any one of the X candidate time window(s) has a time length equal to a first time length, and the first time length is fixed; for a subcarrier spacing of a subcarrier occupied by the first radio signal, one of the X candidate time window(s) comprises Y candidate time sub-window(s), and the Y is related to the subcarrier spacing of the subcarrier occupied by the first radio signal; the second information is used for indicating W candidate time sub-window(s) out of the Y candidate time sub-window
(Continued)

(s); and each of the W1 time sub-window(s) is one of the W candidate time sub-window(s).

20 Claims, 14 Drawing Sheets

Related U.S. Application Data continuation of application No. 16/833,699, filed on Mar. 30, 2020, now Pat. No. 11,509,443, which is a continuation of application No. PCT/CN2019/095953, filed on Jul. 15, 2019.

(51) Int. Cl.
*H04W 24/08* (2009.01)
*H04W 72/0446* (2023.01)
*H04W 72/0453* (2023.01)

(52) U.S. Cl.
CPC ....... *H04W 24/08* (2013.01); *H04W 72/0446* (2013.01); *H04W 72/0453* (2013.01)

(56) References Cited

FOREIGN PATENT DOCUMENTS

| CN | 108024363 A | 5/2018 |
|---|---|---|
| CN | 108270531 A | 7/2018 |

OTHER PUBLICATIONS

CN 1st Search Report received in application No. 201810852866.3 dated May 17, 2020.
Huawei et al."Discussion on the P-UE Resource Selection" 3GPP TSG RAN WGI Meeting #86bis, Oct. 14, 2016 (Oct. 14, 2016), section 3.2 R1-1608649.
Huawei et al. Remaining Issues on P-UE Partial Sensing 3GPP TSG RAN WGI Meeting #88, Feb. 17, 2017 (Feb. 17, 2017) R1-1701768.
International Search report of the patent application No. PCT/CN2019/095953, dated Oct. 9, 2019.
Notification to Grant Patent Right for Invention of Chinses patent application No. 201810852866.3 dated Aug. 5, 2020.

METHOD AND DEVICE IN NODE FOR WIRELESS COMMUNICATION

CROSS-REFERENCE TO RELATED APPLICATION

This application is a continuation of the U.S. patent application Ser. No. 17/967,861, filed on Oct. 17, 2022, which is a continuation of the U.S. patent application Ser. No. 16/833,699, filed on Mar. 30, 2020, which is a continuation of International Application No. PCT/CN2019/095953, filed on Jul. 15, 2019, claiming the priority benefit of Chinese Application No. 201810852866.3, filed on Jul. 30, 2018, the full disclosure of which is incorporated herein by reference.

BACKGROUND

Technical Field

The disclosure relates to transmission methods and devices in wireless communication systems, and in particular to a multicarrier, multi-antenna and bandwidth related transmission method and device in wireless communication.

Related Art

Application scenarios of future wireless communication systems are becoming increasingly diversified, and different application scenarios have different performance requirements on systems. In order to meet different performance requirements of various application scenarios, the 3rd Generation Partner Project (3GPP) Radio Access Network (RAN) #72 plenary session decided to conduct the study of New Radio (NR). The work item of NR was approved at the 3GPP RAN #75 session to standardize the NR.

As Vehicle-to-Everything (V2X) services are developing rapidly, 3GPP has also started the standardization work and researches under NR framework. At present, 3GPP has accomplished the work of formulation of requirements for 5G V2X services, which are captured by standard TS22.886. 3GPP identifies and defines four use case groups for 5G V2X services, including Vehicles Platnooning, Extended Sensors, Advanced Driving and Remote Driving. The Study Item (SI) of technical research of NR V2X was approved at the 3GPP RAN #80 session.

SUMMARY

Compared with existing LTE systems, 5G NR has one significant feature by which it can support a more flexible numerology, including Subcarrier Spacing (SC S) and Cyclic Prefix (CP) length, and can support a more flexible frame structure, including mini-slot, sub-slot and slot aggregation. This kind of flexible numerology and flexible frame structure can better meet various new service requirements, especially the very diverse service requirements of vertical industries. Compared with LTE V2X systems, NR V2X services, as one important part of vertical industries, have higher throughput, higher reliability, lower latency, further transmission distance, more accurate positioning, higher variability in packet size and transmission periodicity, and key technical features coexisting with current 3GPP technologies and non-3GPP technologies more efficiently. In order to meet these higher performance requirements, NR V2X is expected to follow and further enhance the designs of flexible numerology and flexible frame structure in existing 5G NR systems.

In view of the problems of supporting a flexible numerology and a flexible frame structure in NR V2X, the disclosure provides a solution. It should be noted that the embodiments of the UE of the disclosure and the characteristics in the embodiments may be applied to the base station, and vice versa. The embodiments of the disclosure and the characteristics in the embodiments may be mutually combined arbitrarily if no conflict is incurred.

The disclosure provides a method in a first-type communication node for wireless communications, comprising:
  receiving first information and second information; and
  transmitting a first radio signal in W1 time sub-window(s).

Herein, the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, a time-domain resource pool for the first radio signal is configured hierarchically through the first information and the second information, which provides a scheme of configuration of a time-domain resource pool for supporting various different numerologies and frame structures. The two-level configuration scheme can ensure the flexibilities of numerology and frame structure in the condition of being seamless compatible with LTE V2X.

In one embodiment, compared with a single-level configuration scheme of a time-domain resource pool in LTE V2X, the hierarchical configuration scheme of a time-domain resource pool based on a numerology of the first radio signal and employing the first information and the second information may reduce overheads of signalings, reduce a probability of collision when out of coverage, and reduce a complexity of implementation due to various different numerologies and frame structures.

According to one aspect of the disclosure, the above method is characterized in that: any two of the Y candidate time sub-windows are orthogonal, the Y candidate time sub-windows are arranged orderly according to time sequence, and the W candidate time sub-window(s) is(are) W consecutively arranged candidate time sub-window(s) among the Y candidate time sub-windows.

In one embodiment, the W candidate time sub-window(s) is(are) W consecutively arranged candidate time sub-window(s) among the Y candidate time sub-windows to ensure a continuity of resources when selecting a time-domain resource pool, which may avoid fragmentation of resources due to various different numerologies and frame structures, and may effectively reduce the probability of collision when out of coverage.

According to one aspect of the disclosure, the above method is characterized in that: the W candidate time sub-window(s) belong(s) to one of Q candidate time sub-window sets, and any one of the Q candidate time sub-window sets includes a positive integer number of candidate time sub-window(s) out of the Y candidate time sub-window(s); the second information is used for determining out of the Q candidate time sub-window sets a candidate time sub-window set to which the W candidate time sub-window(s) belong(s); the Q candidate time sub-window sets include two candidate time sub-window sets orthogonal to each other, candidate time sub-windows in the two candidate time sub-window sets orthogonal to each other constitute one of the Q candidate time sub-window sets, and the Q is a positive integer greater than 2.

In one embodiment, the design of the Q candidate time sub-window sets employs a nested structure, and when devices employing different numerologies and/or frame structures share a same resource pool, a probability of collision may be greatly reduced, thus a success rate of transmission is improved.

According to one aspect of the disclosure, the above method further includes:
receiving third information; and
transmitting a first signaling.

Herein, the third information is used for determining the W1 time sub-window(s) out of the W candidate time sub-window(s) and frequency-domain resources occupied by the first radio signal, the first signaling is used for indicating the W1 time sub-window(s) and the frequency-domain resources occupied by the first radio signal, and the first signaling is transmitted via a first air interface.

According to one aspect of the disclosure, the above method further includes:
monitoring a second radio signal in M time window(s).

Herein, a monitor of the second radio signal assumes that there are time-domain resources reserved for a radio signal other than the first radio signal within X1 candidate time window(s) out of the X candidate time window(s), and the X1 is a non-negative integer not greater than the X; when the second radio signal is detected in one of the M time window(s), a time-domain position of the second radio signal is used for determining the X1 candidate time window(s) out of the X candidate time window(s); an end time of any one of the M time window(s) is not later than a start time of any one of the X candidate time window(s), and the M is a positive integer.

According to one aspect of the disclosure, the above method is characterized in that: a monitor of the second radio signal assumes that there are time-domain resources reserved for a radio signal other than the first radio signal within Y1 candidate time sub-window(s) out of the Y candidate time sub-window(s), and the Y1 is a non-negative integer not greater than the Y; when the second radio signal is detected in a target time window, a time-domain position of time-domain resources occupied by the second radio signal in the target time window is used for determining the Y1 candidate time sub-window(s) out of the Y candidate time sub-window(s), and the target time window is one of the M time window(s).

The disclosure provides a method in a second-type communication node for wireless communications, wherein the method includes:
transmitting first information and second information.

Herein, the first information is used for determining X candidate time window(s), any one of the X candidate time window(s) has a time length equal to a first time length, the first time length is fixed, and the X is a positive integer; a first radio signal is transmitted by a receiver of the first information in W1 time sub-window(s), for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

According to one aspect of the disclosure, the above method is characterized in that: any two of the Y candidate time sub-windows are orthogonal, the Y candidate time sub-windows are arranged orderly according to time sequence, and the W candidate time sub-window(s) is(are) W consecutively arranged candidate time sub-window(s) among the Y candidate time sub-windows.

According to one aspect of the disclosure, the above method is characterized in that: the W candidate time sub-window(s) belong(s) to one of Q candidate time sub-window sets, and any one of the Q candidate time sub-window sets includes a positive integer number of candidate time sub-window(s) out of the Y candidate time sub-window(s); the second information is used for determining out of the Q candidate time sub-window sets a candidate time sub-window set to which the W candidate time sub-window(s) belong(s); the Q candidate time sub-window sets include two candidate time sub-window sets orthogonal to each other, candidate time sub-windows in the two candidate time sub-window sets orthogonal to each other constitute one of the Q candidate time sub-window sets, and the Q is a positive integer greater than 2.

According to one aspect of the disclosure, the above method further includes:
transmitting third information.

Herein, the third information is used for determining the W1 time sub-window(s) out of the W candidate time sub-window(s) and frequency-domain resources occupied by the first radio signal.

The disclosure provides a first-type communication node for wireless communication, wherein the first-type communication node includes:
a first receiver, to receive first information and second information; and
a first transceiver, to transmit a first radio signal in W1 time sub-window(s).

Herein, the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

The disclosure provides a second-type communication node for wireless communication, wherein the second-type communication node includes:
a first transmitter, to transmit first information and second information.

Herein, the first information is used for determining X candidate time window(s), any one of the X candidate time window(s) has a time length equal to a first time length, the first time length is fixed, and the X is a positive integer; a first radio signal is transmitted by a receiver of the first information in W1 time sub-window(s), for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, compared with the methods in existing LTE V2X, the disclosure has the following advantages.

Through the hierarchical configuration of a time-domain resource pool in V2X, a scheme of configuration of a time-domain resource pool is provided for supporting various different numerologies and frame structures. The two-level configuration scheme can ensure the flexibilities of configurations of numerology and frame structure in the condition of being seamless compatible with LTE V2X.

The adoption of the hierarchical configuration scheme of a time-domain resource pool may reduce overheads of signalings, reduce a probability of collision when out of coverage, and reduce a complexity of implementation due to various different numerologies and frame structures.

A continuity of resources is ensured when resources of a time-domain resource pool are selected, which may avoid fragmentation of resources due to various different numerologies and frame structures, and may effectively reduce a probability of collision when out of coverage.

A nested structure is employed to limit candidate distributions (or patterns) of a time-domain resource pool, and when devices employing different numerologies and/or frame structures share a same resource pool, the probability of collision may be greatly reduced, thus a success rate of transmission is improved.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
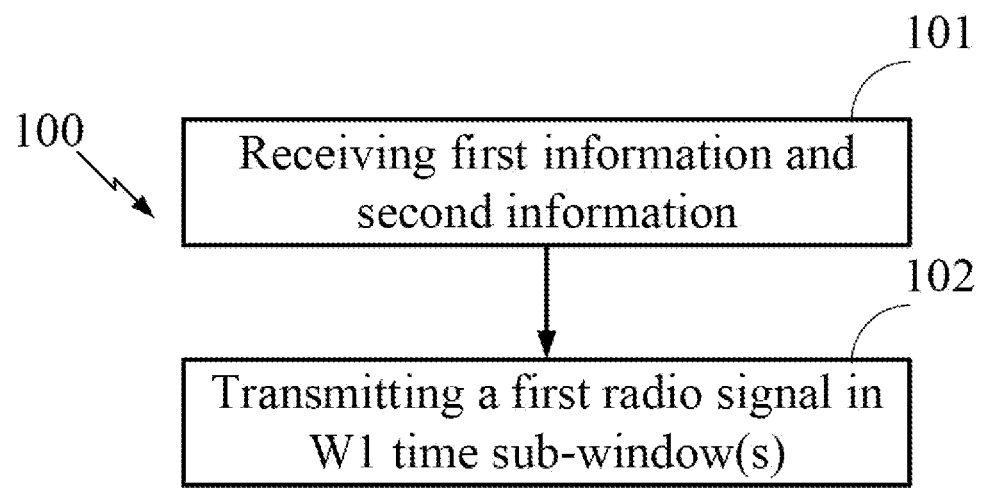
FIG. 1 is a flowchart of transmission of first information, second information and a first radio signal according to one embodiment of the disclosure.

Embodiment 1 illustrates an example of a flowchart of transmission of first information, second information and a first radio signal according to one embodiment of the disclosure, as shown in FIG. 1. In FIG. 1, each box represents one step. In Embodiment 1, the first-type communication node in the disclosure receives first information and second information in S101, and transmits a first radio signal in W1 time sub-window(s) in S102; wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, the first information is one piece of higher layer information.

In one embodiment, the first information is one piece of physical layer information.

In one embodiment, the first information is transmitted through one physical layer signaling.

In one embodiment, the first information is transmitted through one higher layer signaling.

In one embodiment, the first information includes a part or entirety of one piece of higher layer information.

In one embodiment, the first information includes a part or entirety of one piece of physical layer information.

In one embodiment, the first information is transmitted through a Downlink Shared Channel (DL-SCH).

In one embodiment, the first information is transmitted through a Physical Downlink Shared Channel (PDSCH).

In one embodiment, the first information includes one or more fields in one System Information Block (SIB).

In one embodiment, the first information includes one or more fields in Remaining System Information (RMSI).

In one embodiment, the first information includes a part or entirety of one Radio Resource Control (RRC) signaling.

In one embodiment, the first information includes a part or entirety of one piece of RRC layer information.

In one embodiment, the first information includes part or all fields in one Information Element (IE) in one piece of RRC layer information.

In one embodiment, the first information is broadcast.

In one embodiment, the first information is unicast.

In one embodiment, the first information is cell specific.

In one embodiment, the first information is UE specific.

In one embodiment, the first information is transmitted through a Physical Downlink Control Channel (PDCCH).

In one embodiment, the first information includes part or all fields in one Downlink Control Information (DCI) signaling.

In one embodiment, the phrase that the first information is used for determining the X candidate time window(s) refers that: the first information is used by the first-type communication node to determine the X candidate time window(s).

In one embodiment, the phrase that the first information is used for determining the X candidate time window(s) refers that: the first information indicates directly the X candidate time window(s).

In one embodiment, the phrase that the first information is used for determining the X candidate time window(s) refers that: the first information indicates indirectly the X candidate time window(s).

In one embodiment, the phrase that the first information is used for determining the X candidate time window(s) refers that: the first information indicates explicitly the X candidate time window(s).

In one embodiment, the phrase that the first information is used for determining the X candidate time window(s) refers that: the first information indicates implicitly the X candidate time window(s).

In one embodiment, the first information employs a same design as an "sl-Subframe" of an IE "SL-CommResourcePool" in 3GPP TS36.331 (v15.2.0).

In one embodiment, the second information is one piece of higher layer information.

In one embodiment, the second information is one piece of physical layer information.

In one embodiment, the second information is transmitted through one physical layer signaling.

In one embodiment, the second information is transmitted through one higher layer signaling.

In one embodiment, the second information includes a part or entirety of one piece of higher layer information.

In one embodiment, the second information includes a part or entirety of one piece of physical layer information.

In one embodiment, the second information is transmitted through a DL-SCH.

In one embodiment, the second information is transmitted through a PDSCH.

In one embodiment, the second information includes one or more fields in one SIB.

In one embodiment, the second information includes one or more fields in an RMSI.

In one embodiment, the second information includes a part or entirety of one RRC signaling.

In one embodiment, the second information includes a part or entirety of one piece of RRC layer information.

In one embodiment, the second information includes part or all fields in one IE in one piece of RRC layer information.

In one embodiment, the second information is broadcast.

In one embodiment, the second information is unicast.

In one embodiment, the second information is cell specific.

In one embodiment, the second information is UE specific.

In one embodiment, the second information is transmitted through a PDCCH.

In one embodiment, the second information includes part or all fields in one DCI signaling.

In one embodiment, the phrase that the second information is used for indicating the W candidate time sub-window(s) out of the Y candidate time sub-window(s) refers that: the second information is used for indicating directly the W candidate time sub-window(s) from the Y candidate time sub-window(s).

In one embodiment, the phrase that the second information is used for indicating the W candidate time sub-window(s) out of the Y candidate time sub-window(s) refers that: the second information is used for indicating indirectly the W candidate time sub-window(s) out of the Y candidate time sub-window(s).

In one embodiment, the phrase that the second information is used for indicating the W candidate time sub-window(s) out of the Y candidate time sub-window(s) refers that: the second information is used for indicating explicitly the W candidate time sub-window(s) out of the Y candidate time sub-window(s).

In one embodiment, the phrase that the second information is used for indicating the W candidate time sub-window(s) out of the Y candidate time sub-window(s) refers that: the second information is used for indicating implicitly the W candidate time sub-window(s) out of the Y candidate time sub-window(s).

In one embodiment, the second information includes one bitmap, each bit in the bitmap represents one of the Y candidate time sub-window(s), each bit "0" in the bitmap indicates that a candidate time sub-window represented by the bit "0" is one of the W candidate time sub-window(s), and each bit "1" in the bitmap indicates that a candidate time sub-window represented by the bit "1" is a candidate time sub-window other than the W candidate time sub-window(s).

In one embodiment, the second information includes one bitmap, each bit in the bitmap represents one of the Y candidate time sub-window(s), each bit "1" in the bitmap indicates that a candidate time sub-window represented by the bit "1" is one of the W candidate time sub-window(s), and each bit "0" in the bitmap indicates that a candidate time sub-window represented by the bit "0" is a candidate time sub-window other than the W candidate time sub-window(s).

In one embodiment, the first information and the second information are transmitted via an air interface.

In one embodiment, the first information and the second information are transmitted via a Uu interface.

In one embodiment, the first information and the second information are transmitted through a radio signal.

In one embodiment, the first information and the second information are transmitted from the second-type communication node to the first-type communication node.

In one embodiment, the first information and the second information are transmitted from a higher layer of the first-type communication node to a physical layer of the first-type communication node.

In one embodiment, the first information and the second information are transmitted inside the first-type communication node.

In one embodiment, the first information and the second information are semi-statically configured and dynamically configured respectively.

In one embodiment, the first information and the second information are both semi-statically configured.

In one embodiment, the first information and the second information are both dynamically configured.

In one embodiment, the first information and the second information are two different IEs in one same piece of RRC information.

In one embodiment, the first information and the second information are two different fields in one same IE in one same piece of RRC information.

In one embodiment, the first information and the second information are two IEs in two different pieces of RRC information.

In one embodiment, the first information and the second information are two different fields in one same DCI.

In one embodiment, the first information and the second information are two fields in two different DCIs.

In one embodiment, time-domain resources occupied by the first radio signal belong to the W1 time sub-window(s).

In one embodiment, time-domain resources occupied by the first radio signal belong to partial of the W1 time sub-windows, wherein the W1 is greater than 1.

In one embodiment, the first radio signal occupies each of the W1 time sub-window(s).

In one embodiment, the first radio signal occupies partial of the W1 time sub-windows, wherein the W1 is a positive integer greater than 1.

In one embodiment, the W1 is equal to 1.

In one embodiment, the W1 is a positive integer greater than 1.

In one embodiment, the first radio signal is transmitted through a sidelink.

In one embodiment, the first radio signal is transmitted via a PC5 interface.

In one embodiment, the first radio signal is unicast.

In one embodiment, the first radio signal is multicast.

In one embodiment, the first radio signal is broadcast.

In one embodiment, the first radio signal carries one Transport Block (TB).

In one embodiment, the first radio signal is transmitted through a data channel.

In one embodiment, the first radio signal is transmitted through a control channel.

In one embodiment, the first radio signal includes both a data signal and a control channel.

In one embodiment, the first radio signal is transmitted through a Sidelink Shared Channel (SL-SCH).

In one embodiment, the first radio signal is transmitted through a Physical Sidelink Shared Channel (PSSCH).

In one embodiment, the first radio signal is transmitted through a Physical Sidelink Control Channel (PSCCH).

In one embodiment, the first radio signal carries Sidelink Control Information (SCI).

In one embodiment, the first radio signal carries both an SCI and a TB.

In one embodiment, the first radio signal carries Scheduling Assignment (SA) information.

In one embodiment, the first radio signal includes an initial transmission of one TB.

In one embodiment, the first radio signal includes a retransmission of one TB.

In one embodiment, one TB is processed in sequence through CRC insertion, channel coding, rate matching, scrambling, modulation, layer mapping, precoding, mapping to resource element, OFDM baseband signal generation, and modulation and upconversion to obtain the first radio signal.

In one embodiment, one TB is processed in sequence through CRC insertion, channel coding, rate matching, scrambling, modulation, layer mapping, precoding, mapping to virtual resource blocks, mapping from virtual to physical resource blocks, OFDM baseband signal generation, and modulation and upconversion to obtain the first radio signal.

In one embodiment, one TB is processed in sequence through CRC insertion, segmentation, code block-level CRC insertion, channel coding, rate matching, concatenation, scrambling, modulation, layer mapping, precoding, mapping to resource element, OFDM baseband signal generation, and modulation and upconversion to obtain the first radio signal.

In one embodiment, one TB is processed in sequence through CRC insertion, segmentation, code block-level CRC insertion, channel coding, rate matching, concatenation, scrambling, modulation, layer mapping, precoding, mapping to virtual resource blocks, mapping from virtual to physical resource blocks, OFDM baseband signal generation, and modulation and upconversion to obtain the first radio signal.

In one embodiment, one TB is processed in sequence through CRC insertion, channel coding, rate matching, scrambling, modulation, layer mapping, transform precoding, precoding, mapping to resource element, OFDM baseband signal generation, and modulation and upconversion to obtain the first radio signal.

In one embodiment, one TB is processed in sequence through CRC insertion, channel coding, rate matching, scrambling, modulation, layer mapping, transform precoding, precoding, mapping to virtual resource blocks, mapping from virtual to physical resource blocks, OFDM baseband signal generation, and modulation and upconversion to obtain the first radio signal.

In one embodiment, one TB is processed in sequence through CRC insertion, segmentation, code block-level CRC insertion, channel coding, rate matching, concatenation, scrambling, modulation, layer mapping, transform precoding, precoding, mapping to resource element, OFDM baseband signal generation, and modulation and upconversion to obtain the first radio signal.

In one embodiment, one TB is processed in sequence through CRC insertion, segmentation, code block-level CRC insertion, channel coding, rate matching, concatenation, scrambling, modulation, layer mapping, transform precoding, precoding, mapping to virtual resource blocks, mapping from virtual to physical resource blocks, OFDM baseband signal generation, and modulation and upconversion to obtain the first radio signal.

In one embodiment, one SCI is processed in sequence through CRC insertion, channel coding, rate matching, scrambling, modulation, mapping to physical resource, OFDM baseband signal generation, and modulation and upconversion to obtain the first radio signal.

In one embodiment, one SCI is processed in sequence through CRC insertion, channel coding, rate matching, scrambling, modulation, transform precoding, mapping to physical resource, OFDM baseband signal generation, and modulation and upconversion to obtain the first radio signal.

In one embodiment, each of the X candidate time window(s) is one subframe.

In one embodiment, each of the X candidate time window(s) is one radio frame.

In one embodiment, each of the X candidate time window(s) is one slot.

In one embodiment, the X candidate time window(s) is(are) contiguous in time domain.

In one embodiment, the X candidate time window(s) is(are) discrete in time domain.

In one embodiment, the X candidate time window(s) occupies(occupy) contiguous time-domain resources in time domain.

In one embodiment, the X candidate time window(s) occupies(occupy) discrete time-domain resources in time domain.

In one embodiment, other time-domain resources than the X candidate time windows are located between two of the X candidate time windows in time domain, wherein the X is greater than 1.

In one embodiment, no time-domain resource other than the X candidate time windows is located between two of the X candidate time windows in time domain, wherein the X is greater than 1.

In one embodiment, any two of the X candidate time windows are orthogonal.

In one embodiment, no time-domain resource belongs to two of the X candidate time windows.

In one embodiment, the first time length is equal to 1 ms.

In one embodiment, the first time length is equal to 10 ms.

In one embodiment, the first time length is equal to a time length of one subframe.

In one embodiment, the first time length is equal to a length of a positive integer number of Orthogonal Frequency Division Multiplexing (OFDM) symbols.

In one embodiment, for a subcarrier spacing of a subcarrier occupied by the first radio signal, each of the Y candidate time sub-window(s) is one slot.

In one embodiment, for a subcarrier spacing of a subcarrier occupied by the first radio signal, each of the Y candidate time sub-window(s) is one subslot.

In one embodiment, for a subcarrier spacing of a subcarrier occupied by the first radio signal, each of the Y candidate time sub-window(s) is one minislot.

In one embodiment, for a subcarrier spacing of a subcarrier occupied by the first radio signal, each of the Y candidate time sub-window(s) includes a positive integer number of OFDM symbols.

In one embodiment, any two of the Y candidate time sub-windows have an equal time length, wherein the Y is greater than 1.

In one embodiment, two of the Y candidate time sub-windows have an unequal time length, wherein the Y is greater than 1.

In one embodiment, the Y candidate time sub-window(s) occupies (occupy) all time-domain resources of a candidate time window among the X candidate time window(s) to which the Y candidate time sub-window(s) belong.

In one embodiment, the Y candidate time sub-window(s) occupies (occupy) partial time-domain resources of a candidate time window among the X candidate time window(s) to which the Y candidate time sub-window(s) is belong.

In one embodiment, a subcarrier spacing of a subcarrier occupied by the first radio signal is one of {15 kHz, 30 kHz, 60 kHz, 120 kHz, 240 kHz, 480 kHz, 960 kHz}.

In one embodiment, a subcarrier spacing of a subcarrier occupied by the first radio signal is equal to 15 kHz to the power of a non-negative integer multiple of 2.

In one embodiment, the phrase that the Y is related to the subcarrier spacing of the subcarrier occupied by the first radio signal refers that: the subcarrier spacing of the subcarrier occupied by the first radio signal is used for determining the Y.

In one embodiment, the phrase that the Y is related to the subcarrier spacing of the subcarrier occupied by the first radio signal refers that: the Y and the subcarrier spacing of the subcarrier occupied by the first radio signal have a mapping relationship.

In one embodiment, the phrase that the Y is related to the subcarrier spacing of the subcarrier occupied by the first radio signal refers that: the Y and the subcarrier spacing of the subcarrier occupied by the first radio signal have a functional relationship.

In one embodiment, the phrase that the Y is related to the subcarrier spacing of the subcarrier occupied by the first radio signal refers that: the subcarrier spacing of the subcarrier occupied by the first radio signal is mapped to the Y through a predefined table.

In one embodiment, the phrase that the Y is related to the subcarrier spacing of the subcarrier occupied by the first radio signal refers that: the Y and the subcarrier spacing of the subcarrier occupied by the first radio signal have a proportional relationship.

In one embodiment, the phrase that the Y is related to the subcarrier spacing of the subcarrier occupied by the first radio signal refers that: the Y and the subcarrier spacing of the subcarrier occupied by the first radio signal have a directly proportional relationship.

In one embodiment, the phrase that the Y is related to the subcarrier spacing of the subcarrier occupied by the first radio signal refers that: the Y and the subcarrier spacing of the subcarrier occupied by the first radio signal have a linear relationship.

In one embodiment, for a given subcarrier spacing of a subcarrier occupied by the first radio signal, the Y is further related to a length of a Cyclic Prefix (CP) of an OFDM symbol occupied by the first radio signal.

In one embodiment, for a given subcarrier spacing of a subcarrier occupied by the first radio signal, the Y is further related to a length of a CP of an OFDM symbol occupied by the first radio signal, wherein the length of the CP of the OFDM symbol occupied by the first radio signal is equal to a normal CP length or an extended CP length.

In one embodiment, for a given subcarrier spacing of a subcarrier occupied by the first radio signal and a given length of a CP of an OFDM symbol occupied by the first radio signal, the Y is further related to a number of OFDM symbols included in the Y candidate time sub-window(s).

In one embodiment, each of the W candidate time sub-window(s) is one of the Y candidate time sub-window(s).

In one embodiment, the W is equal to the W1.

In one embodiment, the W is greater than the W1.

In one embodiment, the Y is greater than 1.

In one embodiment, the Y is equal to one of {2,4,8,16, 32,64}.

In one embodiment, the Y is equal to the non-negative integer power of 2.

In one embodiment, each of the X candidate time window(s) includes Y time sub-window(s) which all has (have) a same time length as one of the Y candidate time sub-window(s).

In one embodiment, one of the X candidate time window(s) includes less than Y time sub-window(s) which all has(have) a same time length as one of the Y candidate time sub-window(s).

Embodiment 2

Figure 2:
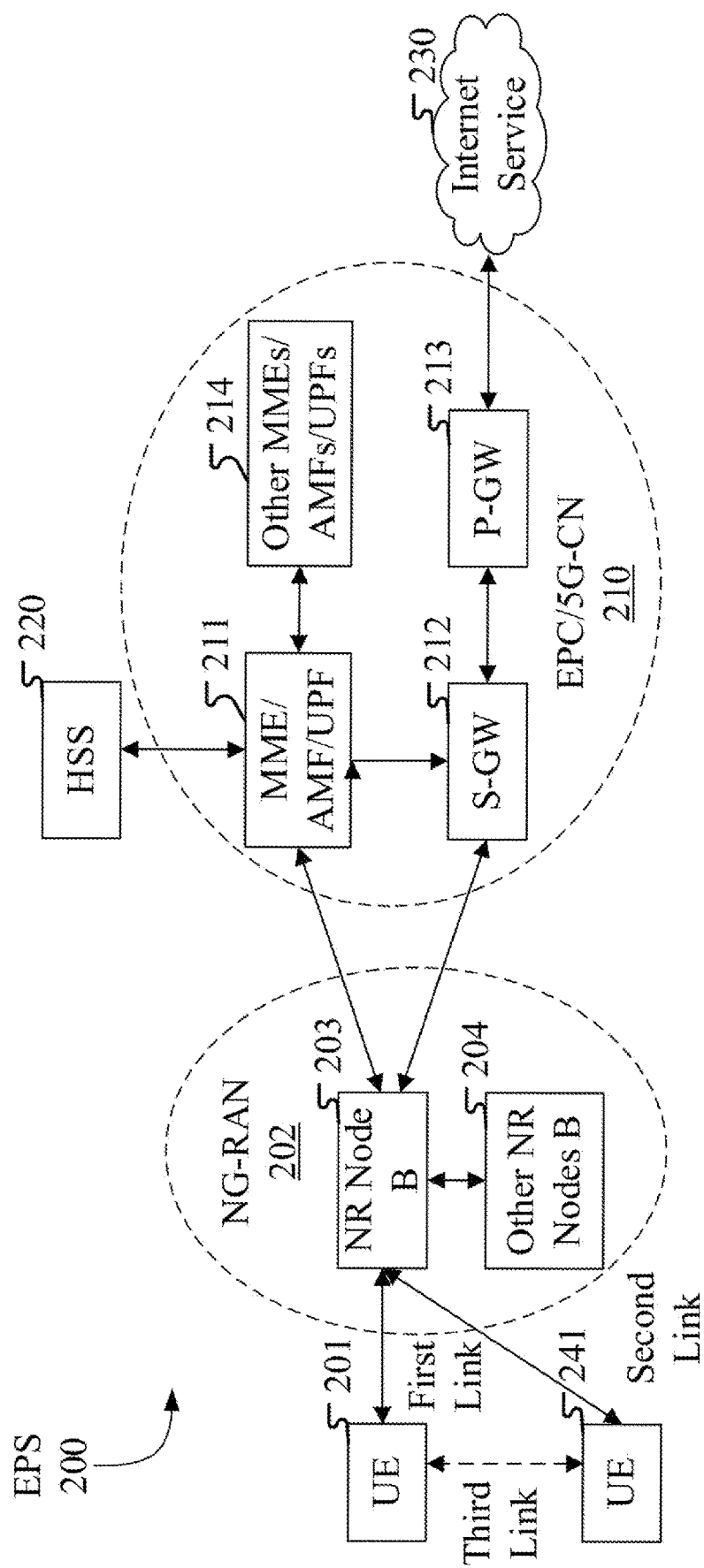
FIG. 2 is a diagram illustrating a network architecture according to one embodiment of the disclosure.

Embodiment 2 illustrates an example of a diagram of a network architecture according to the disclosure, as shown in FIG. 2. FIG. 2 is a diagram illustrating a network architecture 200 of NR 5G, LTE and Long-Term Evolution Advanced (LTE-A) systems. The NR 5G or LTE network architecture 200 may be called an Evolved Packet System (EPS) 200. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. In V2X networks, the gNB 203 may be a base station, a ground base station or Road Side Unit (RSU) relayed by a satellite, etc. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, communication units in automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, an automobile terminal, a V2X equipment, or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first-type communication equipment in the disclosure.

In one embodiment, the UE 201 supports transmissions in a sidelink.

In one embodiment, the UE 201 supports a PC5 interface.

In one embodiment, the UE 201 supports Internet of vehicles.

In one embodiment, the UE 201 supports V2X services.

In one embodiment, the gNB 203 corresponds to the second-type communication equipment in the disclosure.

In one embodiment, the gNB 203 supports Internet of vehicles.

In one embodiment, the gNB 203 supports V2X services.

Embodiment 3

Figure 3:
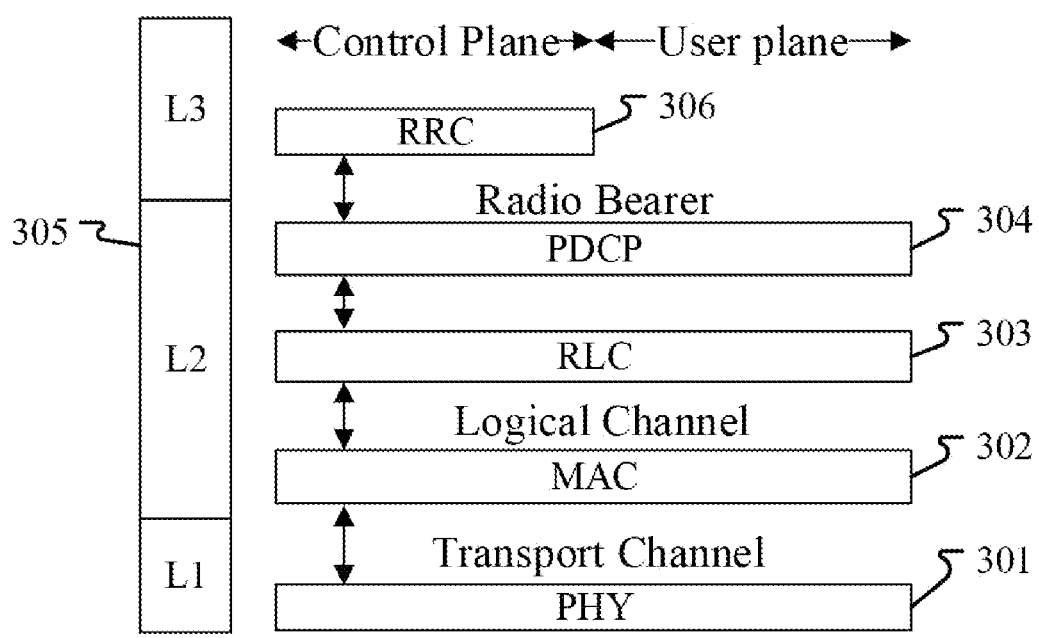
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture between a first-type communication node (UE) and a second-type communication node (gNB, eNB or RSU in V2X) or between two first-type communication nodes is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first-type communication node and the second-type communication node and between two first-type communication nodes (UEs) over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the second-type communication node on the network side. Although not shown, the first-type communication node may include several higher layers above the L2 layer 355, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 354 also provides header compression for higher-layer packets so as to reduce radio transmission overheads. The PDCP sublayer 304 provides security by encrypting packets and provides support for handover of the first-type communication node between the second-type communication nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first-type communication nodes. The MAC sublayer 302 is also in charge of HARQ operations. In the control plane, the radio protocol architecture of the first-type communication node and the second-type communication node is substantially the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the second-type communication node and the first-type communication node.

In one embodiment, the radio protocol architecture shown in FIG. 3 is applicable to the first-type communication node in the disclosure.

In one embodiment, the radio protocol architecture shown in FIG. 3 is applicable to the second-type communication node in the disclosure.

In one embodiment, the first information in the disclosure is generated by the RRC 306.

In one embodiment, the first information in the disclosure is generated by the MAC 302.

In one embodiment, the first information in the disclosure is generated by the PHY 301.

In one embodiment, the second information in the disclosure is generated by the RRC 306.

In one embodiment, the second information in the disclosure is generated by the MAC 302.

In one embodiment, the second information in the disclosure is generated by the PHY 301.

In one embodiment, the first radio signal in the disclosure is generated by the RRC 306.

In one embodiment, the first radio signal in the disclosure is generated by the MAC 302.

In one embodiment, the first radio signal in the disclosure is generated by the PHY 301.

In one embodiment, the third information in the disclosure is generated by the RRC 306.

In one embodiment, the third information in the disclosure is generated by the MAC 302.

In one embodiment, the third information in the disclosure is generated by the PHY 301.

In one embodiment, the first signaling in the disclosure is generated by the RRC 306.

In one embodiment, the first signaling in the disclosure is generated by the PHY 301.

In one embodiment, the second radio signal in the disclosure is generated by the RRC 306.

In one embodiment, the second radio signal in the disclosure is generated by the MAC 302.

In one embodiment, the second radio signal in the disclosure is generated by the PHY 301.

Embodiment 4

Figure 4:
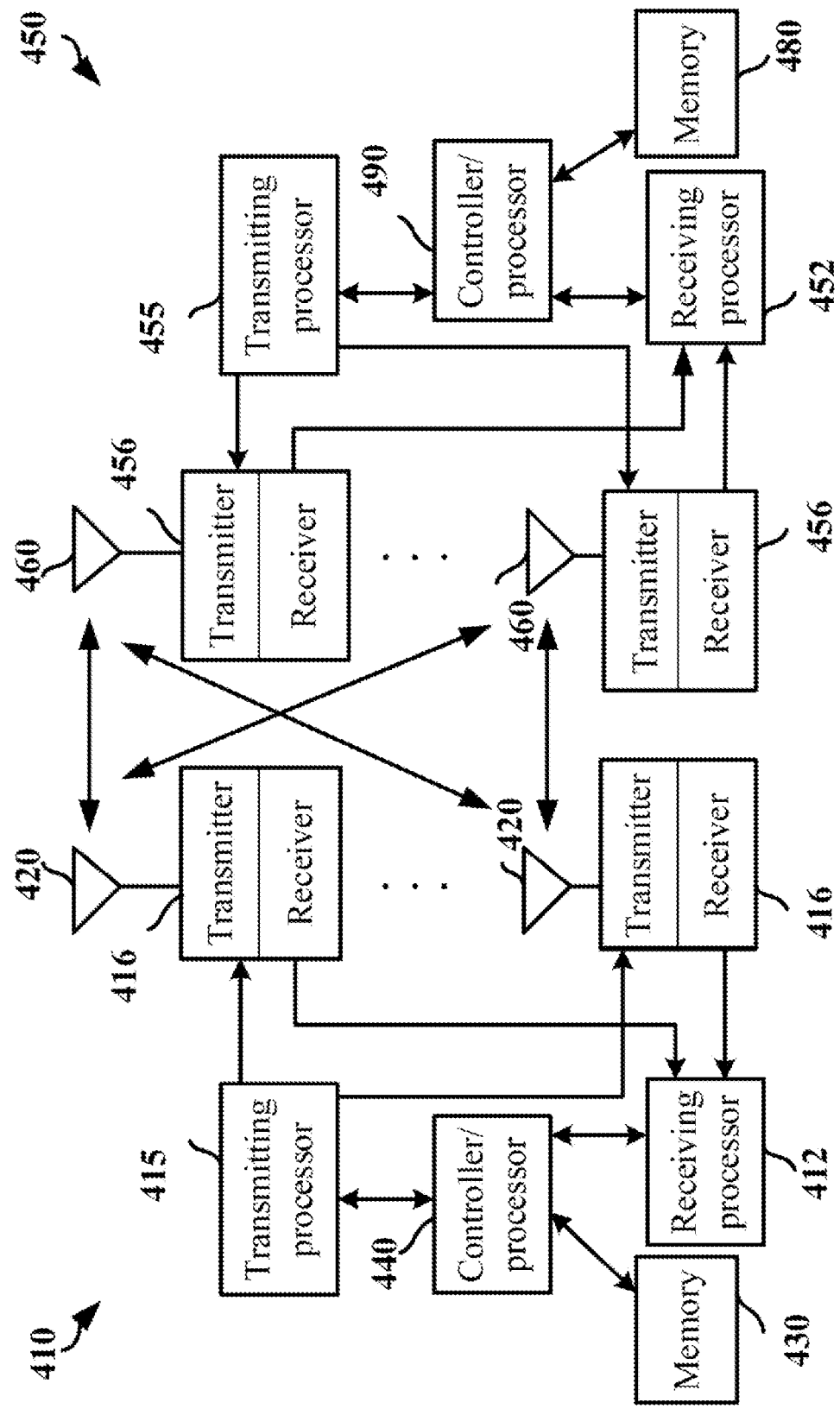
FIG. 4 is a diagram illustrating a first-type communication node and a second-type communication node according to one embodiment of the disclosure.

Embodiment 4 illustrates a diagram of a first-type communication node and a second-type communication node according to the disclosure, as shown in FIG. 4.

The first-type communication node 450 includes a controller/processor 490, a memory 480, a receiving processor 452, a transmitter/receiver 456, a transmitting processor 455 and a data source 467. The transmitter/receiver 456 includes an antenna 460. The data source 467 provides higher-layer packets to the controller/processor 490. The controller/processor 490 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, Downlink Shared Channel (DL-SCH) or Uplink Shared Channel (UL-SCH) or Sidelink Shared Channel (SL-SCH). The transmitting processor 455 performs various signal transmitting processing functions of L1 layer (that is, PHY), including encoding, interleaving, scrambling, modulation, power control/allocation, precoding, generation of physical layer control signalings, etc. The receiving processor 452 performs various signal receiving processing functions of L1 layer (that is, PHY), including decoding, de-interleaving, descrambling, demodulation, de-precoding, extraction of physical layer control signalings, etc. The transmitter 456 is configured to convert a baseband signal provided by the transmitting processor 455 into a radio-frequency signal and transmit the radio-frequency signal via the antenna 460. The receiver 456 is configured to convert a radio-frequency signal received via the antenna 460 into a baseband signal and provide the baseband signal to the receiving processor 452.

The second-type communication node 410 may include a controller/processor 440, a memory 430, a receiving processor 412, a transmitter/receiver 416 and a transmitting processor 415. The transmitter/receiver 416 includes an antenna 420. Higher-layer packets are provided to the controller/processor 440. The controller/processor 440 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, DL-SCH or UL-SCH. The transmitting processor 415 performs various signal transmitting processing functions of L1 layer (that is, PHY), including encoding, interleaving, scrambling, modulation, power control/allocation, precoding, generation of physical layer control signalings (including synchronization signal and reference signal), etc. The receiving processor 412 performs various signal receiving processing functions of L1 layer (that is, PHY), including decoding, de-interleaving, descrambling, demodulation, de-precoding, extraction of physical layer control signalings, etc. The transmitter 416 is configured to convert a baseband signal provided by the transmitting processor 415 into a radio-frequency signal and transmit the radio-frequency signal via the antenna 420. The receiver 416 is configured to convert a radio-frequency signal received via the antenna 420 into a baseband signal and provide the baseband signal to the receiving processor 412.

In Downlink (DL) transmission, a higher-layer packet (for example, the first information, the second information and the third information in the disclosure) is provided to the controller/processor 440. The controller/processor 440 performs functions of L2 layer. In DL transmission, the controller/processor 440 provides header compression, encryption, packet segmentation and reordering, multiplexing between a logical channel and a transport channel, and radio resource allocation for the first-type communication node 450 based on various priority metrics. The controller/processor 440 is also in charge of HARQ operation, retransmission of lost packets, and signalings to the first-type communication node 450; for example, the first information, the second information and the third information in the disclosure are all generated in the controller/processor 440. The transmitting processor 415 performs various signal processing functions of L1 layer (that is, PHY), including coding, interleaving, scrambling, modulation, power control/allocation, precoding and generation of physical layer signaling. Generations of physical layer signals of the first information, the second information and the third information in the disclosure are all accomplished at the transmitting processor 415. The modulated symbols are split into parallel streams. Each of the parallel streams is mapped to corresponding subcarriers of multi-carriers and/or multi-carrier symbols. Then the transmitting processor 415 maps the parallel streams to the antenna 420 via the transmitter 416 so as to transmit the parallel streams in the form of Radio Frequency (RF) signals. Corresponding channels on PHY of the first information, the second information and the third information in the disclosure are mapped to target air-interface resources by the transmitting processor 415 and are mapped to the antenna 420 via the transmitter 416 so as to be transmitted in the form of RF signals. At the receiving side, every receiver 456 receives an RF signal via the corresponding antenna 460. Every receiver 456 recovers the baseband information modulated to the RF carrier and provides the baseband information to the receiving processor 452. The receiving processor 452 performs various signal receiving processing functions of L1 layer. The signal receiving processing functions include receptions of physical layer signals of the first information, the second information and the third information in the disclosure, conducting demodulation corresponding to different modulation schemes (i.e., BPSK, QPSK, etc.) through multi-carrier symbols in multi-carrier symbol streams, then descrambling, decoding and de-interleaving to recover the data or control signal transmitted by the second-type communication node 410 on the physical channel, and then providing the data and control signal to the controller/processor 490. The controller/processor 490 performs functions of L2 layer. The controller/processor 490 interprets the first information, the second information and the third information in the disclosure. The controller/processor may be connected to the memory 480 that stores program codes and data. The memory 480 may be called a computer readable medium.

In one embodiment, the first-type communication node 450 includes at least one processor and at least one memory. The at least one memory includes computer program codes. The at least one memory and the computer program codes are configured to be used in collaboration with the at least one processor. The first-type communication node 450 at least receives first information and second information, and transmits a first radio signal in W1 time sub-window(s); wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, the first-type communication node 450 includes a memory that stores a computer readable instruction program. The computer readable instruction program generates an action when executed by at least one processor. The action includes receiving first information and second information, and transmitting a first radio signal in W1 time sub-window(s); wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, the second-type communication node 410 includes at least one processor and at least one memory. The at least one memory includes computer program codes. The at least one memory and the computer program codes are configured to be used in collaboration with the at least one processor. The second-type communication node 410 at least transmits first information and second information; wherein the first information is used for determining X candidate time window(s), any one of the X candidate time window(s) has a time length equal to a first time length, the first time length is fixed, and the X is a positive integer; a first radio signal is transmitted by a receiver of the first information in W1 time sub-window(s), for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, the second-type communication node 410 includes a memory that stores a computer readable instruction program. The computer readable instruction program generates an action when executed by at least one processor. The action includes transmitting first information and second information; wherein the first information is used for determining X candidate time window(s), any one of the X candidate time window(s) has a time length equal to a first time length, the first time length is fixed, and the X is a positive integer; a first radio signal is transmitted by a receiver of the first information in W1 time sub-window(s), for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, the receiver 456 (including the antenna 460), the receiving processor 452 and the controller/processor 490 are used for receiving the first information in the disclosure.

In one embodiment, the receiver 456 (including the antenna 460), the receiving processor 452 and the controller/processor 490 are used for receiving the second information in the disclosure.

In one embodiment, the receiver 456 (including the antenna 460), the receiving processor 452 and the controller/processor 490 are used for receiving the third information in the disclosure.

In one embodiment, the transmitter 416 (including the antenna 420), the transmitting processor 415 and the controller/processor 440 are used for transmitting the first information in the disclosure.

In one embodiment, the transmitter 416 (including the antenna 420), the transmitting processor 415 and the controller/processor 440 are used for transmitting the second information in the disclosure.

In one embodiment, the transmitter 416 (including the antenna 420), the transmitting processor 415 and the controller/processor 440 are used for transmitting the third information in the disclosure.

Embodiment 5

Figure 5:
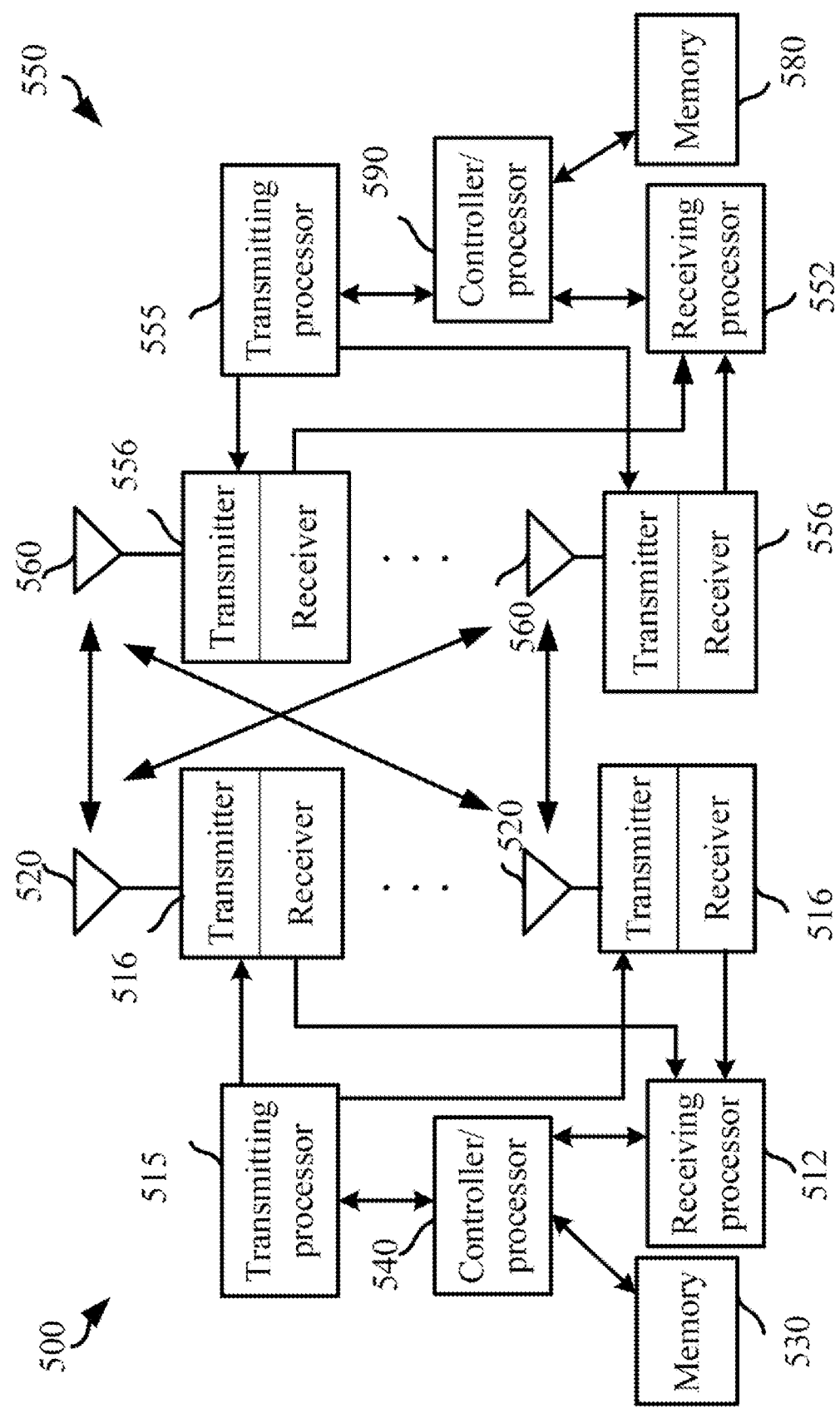
FIG. 5 is a diagram illustrating two first-type communication nodes according to one embodiment of the disclosure.

Embodiment 5 illustrates a diagram of two first-type communication nodes according to one embodiment of the disclosure, as shown in FIG. 5.

The first-type communication node 550 includes a controller/processor 590, a memory 580, a receiving processor 552, a transmitter/receiver 556, a transmitting processor 555 and a data source 567. The transmitter/receiver 556 includes an antenna 560. The data source 567 provides higher-layer packets to the controller/processor 590. The controller/processor 590 provides header compression/decompression, encryption/decryption, packet segmentation and reordering, multiplexing/de-multiplexing between a logical channel and a transport channel, to implement L2 protocols. The higher-layer packet may include data or control information, for example, SL-SCH. The transmitting processor 555 performs various signal transmitting processing functions of L1 layer (that is, PHY), including encoding, interleaving, scrambling, modulation, power control/allocation, precoding, generation of physical layer control signalings, etc. The receiving processor 552 performs various signal receiving processing functions of L1 layer (that is, PHY), including decoding, de-interleaving, descrambling, demodulation, de-precoding, extraction of physical layer control signalings, etc. The transmitter 556 is configured to convert a baseband signal provided by the transmitting processor 555 into a radio-frequency signal and transmit the radio-frequency signal via the antenna 560. The receiver 556 is configured to convert a radio-frequency signal received via the antenna 560 into a baseband signal and provide the baseband signal to the receiving processor 552. Components of the other first-type communication node 50 are the same as those of the first-type communication node 550.

In Sidelink (SL) transmission, a higher-layer packet (for example, the first radio signal in the disclosure) is provided to the controller/processor 540. The controller/processor 540 performs functions of L2 layer. In SL transmission, the controller/processor 540 provides header compression, encryption, packet segmentation and reordering, multiplexing between a logical channel and a transport channel. The controller/processor 540 is also in charge of HARQ operation (if supported), retransmission, and signalings to the first-type communication node 550. The transmitting processor 515 performs various signal processing functions of L1 layer (that is, PHY), including coding, interleaving, scrambling, modulation, power control/allocation, precoding and generation of physical layer signaling. Generations of physical layer signals of the first signaling in the disclosure are all accomplished at the transmitting processor 515. The modulated symbols are split into parallel streams. Each of the parallel streams is mapped to corresponding subcarriers of multi-carriers and/or multi-carrier symbols. Then the transmitting processor 515 maps the parallel streams to the antenna 520 via the transmitter 516 so as to transmit the parallel streams in the form of Radio Frequency (RF) signals. At the receiving side, every receiver 556 receives an RF signal via the corresponding antenna 560. Every receiver 556 recovers the baseband information modulated to the RF carrier and provides the baseband information to the receiving processor 552. The receiving processor 552 performs various signal receiving processing functions of L1 layer. The signal receiving processing functions include receptions of physical layer signals of the first signaling and the first radio signal in the disclosure, conducting demodulation corresponding to different modulation schemes (i.e., BPSK, QPSK, etc.) through multi-carrier symbols in multi-carrier symbol streams, then descrambling, decoding and de-interleaving to recover the data or control signal transmitted by the second-type communication node 510 on the physical channel, and then providing the data and control signal to the controller/processor 590. The controller/processor 590 performs functions of L2 layer. The controller/processor 590 interprets the first radio signal in the disclosure. The controller/processor may be connected to the memory 580 that stores program codes and data. The memory 580 may be called a computer readable medium. Particularly, in the first-type communication node 500, an RF signal of the second radio signal in the disclosure is received through the receiver 516; if to decode the second radio signal in the disclosure, the baseband information modulated to the RF signal is recovered, and the baseband information is provided to the receiving processor 512. The receiving processor 512 performs various signal receiving processing functions of L1 layer, including demodulation and descrambling, decoding and deinterleaving, etc. to recover information carried by the second radio signal, and then provide the information to the controller/processor 540. The controller/processor 540 interprets the second radio signal in the disclosure. If only to perform an energy detection of the second radio signal in the disclosure, it is accomplished at the receiver 516.

In one embodiment, the first-type communication node 500 includes at least one processor and at least one memory. The at least one memory includes computer program codes. The at least one memory and the computer program codes are configured to be used in collaboration with the at least one processor. The first-type communication node 500 at least receives first information and second information, and transmits a first radio signal in W1 time sub-window(s); wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, the first-type communication node 500 includes a memory that stores a computer readable instruction program. The computer readable instruction program generates an action when executed by at least one processor. The action includes receiving first information and second information, and transmitting a first radio signal in W1 time sub-window(s); wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, the receiver 556 (including the antenna 560), the receiving processor 552 and the controller/processor 590 are used for receiving the first radio signal in the disclosure.

In one embodiment, the receiver 556 (including the antenna 560), the receiving processor 552 and the controller/processor 590 are used for receiving the first signaling in the disclosure.

In one embodiment, the transmitter 516 (including the antenna 520), the transmitting processor 515 and the controller/processor 540 are used for transmitting the first radio signal in the disclosure.

In one embodiment, the transmitter 516 (including the antenna 520), the transmitting processor 515 and the controller/processor 540 are used for transmitting the first signaling in the disclosure.

In one embodiment, the receiver 516 (including the antenna 520), the receiving processor 512 and the controller/processor 540 are used for monitoring the second radio signal in the disclosure.

Embodiment 6

Figure 6:
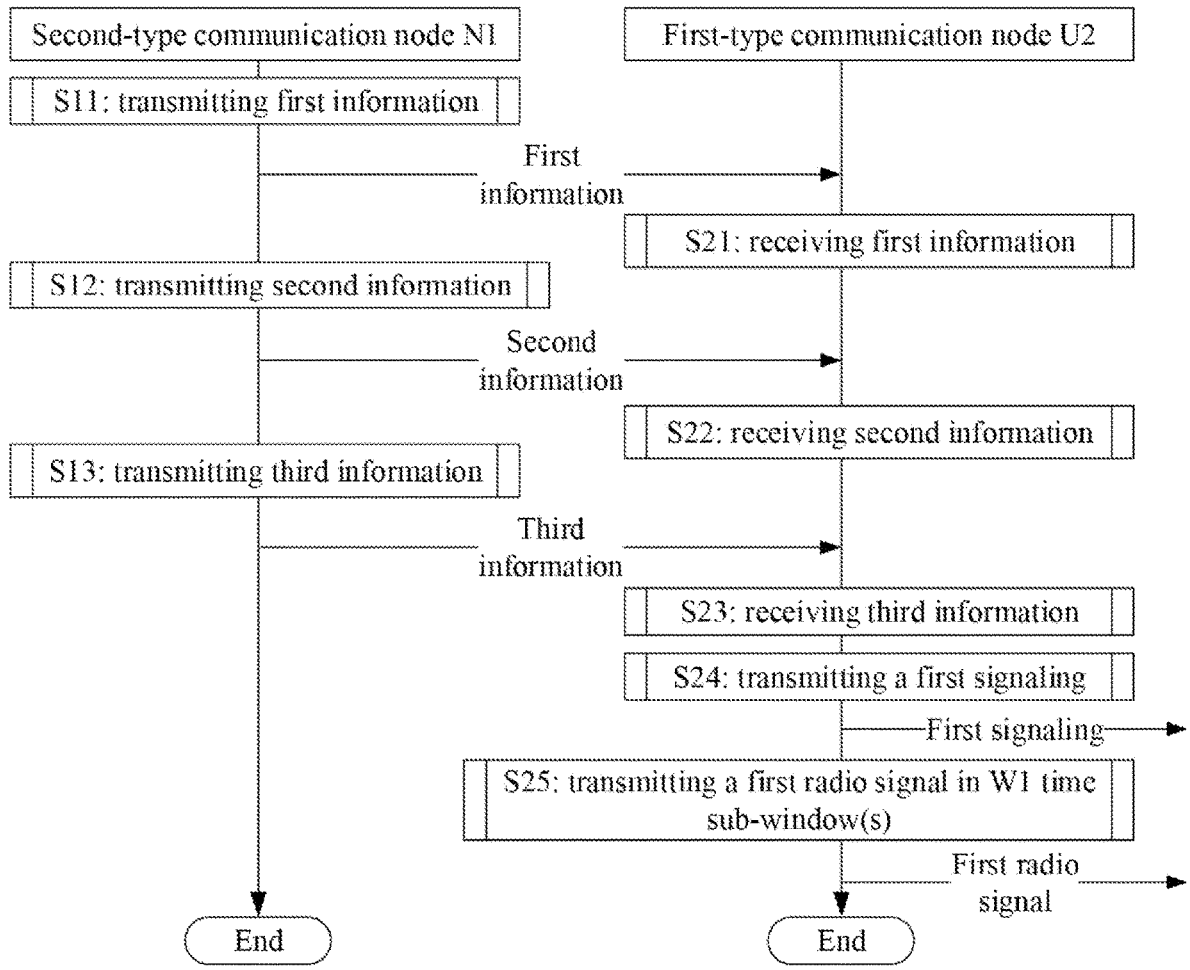
FIG. 6 is a flowchart of transmission of a radio signal according to one embodiment of the disclosure.

Embodiment 6 illustrates an example of a flowchart of transmission of a radio signal according to one embodiment of the disclosure, as shown in FIG. 6. In FIG. 6, a second-type communication node N1 is a maintenance base station for a serving cell of a first-type communication node U2.

The second-type communication node N1 transmits first information in S11, transmits second information in S12, and transmits third information in S13.

The first-type communication node N2 receives first information in S21, receives second information in S22, receives third information in S23, transmits a first signaling in S24, and transmits a first radio signal in W1 time sub-window(s) in S25.

In Embodiment 6, the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; each of the W1 time sub-window(s) is one of the W candidate time sub-window(s); the third information is used for determining the W1 time sub-window(s) out of the W candidate time sub-window(s) and frequency-domain resources occupied by the first radio signal, the first signaling is used for indicating the W1 time sub-window(s) and the frequency-domain resources occupied by the first radio signal, and the first signaling is transmitted via a first air interface.

In one embodiment, any two of the Y candidate time sub-windows are orthogonal, the Y candidate time sub-windows are arranged orderly according to time sequence, and the W candidate time sub-window(s) is(are) W consecutively arranged candidate time sub-window(s) among the Y candidate time sub-windows.

In one embodiment, the W candidate time sub-window(s) belong(s) to one of Q candidate time sub-window sets, and any one of the Q candidate time sub-window sets includes a positive integer number of candidate time sub-window(s) out of the Y candidate time sub-window(s); the second information is used for determining out of the Q candidate time sub-window sets a candidate time sub-window set to which the W candidate time sub-window(s) belong(s); the Q candidate time sub-window sets include two candidate time sub-window sets orthogonal to each other, candidate time sub-windows in the two candidate time sub-window sets orthogonal to each other constitute one of the Q candidate time sub-window sets, and the Q is a positive integer greater than 2.

In one embodiment, the first air interface is wireless.

In one embodiment, the first air interface includes a wireless channel.

In one embodiment, the first air interface includes a sidelink.

In one embodiment, the first air interface is a PC5 interface.

In one embodiment, the third information is transmitted via a second air interface, and the second air interface is different from the first air interface.

In one embodiment, the third information is transmitted via a second air interface, and the second air interface and the first air interface are a Uu interface and a PC5 interface respectively.

In one embodiment, the third information is transmitted via a second air interface, and the second air interface is an air interface between the second-type communication node and the first-type communication node in the disclosure.

In one embodiment, if the third information is transmitted via an air interface, a time interval from a reception end time of the third information to a transmission start time of the first signaling has a time length not less than a first threshold, wherein the first threshold is predefined.

In one embodiment, if the third information is transmitted via an air interface, a time interval from a reception end time of the third information to a transmission start time of the first signaling has a time length not less than a first threshold, wherein the first threshold is fixed.

In one embodiment, if the third information is transmitted via an air interface, a time interval from a reception end time of the third information to a transmission start time of the first signaling has a time length not less than a first threshold, wherein the first threshold is related to a subcarrier spacing of a subcarrier occupied by the first radio signal.

In one embodiment, if the third information is transmitted via an air interface, a time interval from a reception end time of the third information to a transmission start time of the first signaling has a time length not less than a first threshold, wherein the first threshold is related to a processing capability of the first-type communication node.

In one embodiment, the third information is one piece of higher layer information.

In one embodiment, the third information is one piece of physical layer information.

In one embodiment, the third information is transmitted through one physical layer signaling.

In one embodiment, the third information is transmitted through one higher layer signaling.

In one embodiment, the third information includes a part or entirety of one piece of higher layer information.

In one embodiment, the third information includes a part or entirety of one piece of physical layer information.

In one embodiment, the third information is transmitted through a DL-SCH.

In one embodiment, the third information is transmitted through a PDSCH.

In one embodiment, the third information includes one or more fields in one SIB.

In one embodiment, the third information includes one or more fields in an RMSI.

In one embodiment, the third information includes a part or entirety of one RRC signaling.

In one embodiment, the third information includes a part or entirety of one piece of RRC layer information.

In one embodiment, the third information includes part or all fields in one IE in one piece of RRC layer information.

In one embodiment, the third information is broadcast.

In one embodiment, the third information is unicast.

In one embodiment, the third information is cell specific.

In one embodiment, the third information is UE specific.

In one embodiment, the third information is transmitted through a PDCCH.

In one embodiment, the third information includes part or all fields in one DCI signaling.

In one embodiment, the third information is transmitted from a higher layer of the first-type communication node to a physical layer of the first-type communication node.

In one embodiment, the third information is transmitted inside the first-type communication node.

In one embodiment, the third information is dynamically configured.

In one embodiment, the third information is semi-statically configured.

In one embodiment, the phrase that the third information is used for determining the W1 time sub-window(s) out of the W candidate time sub-window(s) and frequency-domain resources occupied by the first radio signal refers that: the third information is used by the first-type communication node to determine the W1 time sub-window(s) out of the W candidate time sub-window(s) and frequency-domain resources occupied by the first radio signal.

In one embodiment, the phrase that the third information is used for determining the W1 time sub-window(s) out of the W candidate time sub-window(s) and frequency-domain resources occupied by the first radio signal refers that: the third information is used for indicating directly the W1 time sub-window(s) out of the W candidate time sub-window(s) and frequency-domain resources occupied by the first radio signal.

In one embodiment, the phrase that the third information is used for determining the W1 time sub-window(s) out of the W candidate time sub-window(s) and frequency-domain resources occupied by the first radio signal refers that: the third information is used for indicating indirectly the W1 time sub-window(s) out of the W candidate time sub-window(s) and frequency-domain resources occupied by the first radio signal.

In one embodiment, the phrase that the third information is used for determining the W1 time sub-window(s) out of the W candidate time sub-window(s) and frequency-domain resources occupied by the first radio signal refers that: the third information is used for indicating explicitly the W1 time sub-window(s) out of the W candidate time sub-window(s) and frequency-domain resources occupied by the first radio signal.

In one embodiment, the phrase that the third information is used for determining the W1 time sub-window(s) out of the W candidate time sub-window(s) and frequency-domain resources occupied by the first radio signal refers that: the third information is used for indicating implicitly the W1 time sub-window(s) out of the W candidate time sub-window(s) and frequency-domain resources occupied by the first radio signal.

In one embodiment, the first information and the third information in the disclosure are two different IEs in one same piece of RRC information.

In one embodiment, the first information and the third information in the disclosure are two different fields in one same IE in one same piece of RRC information.

In one embodiment, the first information and the third information in the disclosure are two IEs in two different pieces of RRC information.

In one embodiment, the first information and the third information in the disclosure are two different fields in one same DCI.

In one embodiment, the first information and the third information in the disclosure are two fields in two different DCIs.

In one embodiment, the first signaling includes physical layer information.

In one embodiment, the first signaling is a transmission of one physical layer signaling.

In one embodiment, the first signaling includes a part or entirety of one piece of physical layer information.

In one embodiment, the first signaling is broadcast.

In one embodiment, the first signaling is multicast.

In one embodiment, the first signaling is unitcast.

In one embodiment, the first signaling is cell specific.

In one embodiment, the first signaling is UE specific.

In one embodiment, the first signaling is transmitted through a PSCCH.

In one embodiment, the first signaling includes part or all fields in one SCI signaling.

In one embodiment, the first signaling includes a Scheduling Assignment (SA) of the first radio signal.

In one embodiment, the phrase that the first signaling is used for indicating the W1 time sub-window(s) and the frequency-domain resources occupied by the first radio signal refers that: the first signaling is used for indicating directly the W1 time sub-window(s) and the frequency-domain resources occupied by the first radio signal.

In one embodiment, the phrase that the first signaling is used for indicating the W1 time sub-window(s) and the frequency-domain resources occupied by the first radio signal refers that: the first signaling is used for indicating indirectly the W1 time sub-window(s) and the frequency-domain resources occupied by the first radio signal.

In one embodiment, the phrase that the first signaling is used for indicating the W1 time sub-window(s) and the frequency-domain resources occupied by the first radio signal refers that: the first signaling is used for indicating explicitly the W1 time sub-window(s) and the frequency-domain resources occupied by the first radio signal.

In one embodiment, the phrase that the first signaling is used for indicating the W1 time sub-window(s) and the frequency-domain resources occupied by the first radio signal refers that: the first signaling is used for indicating implicitly the W1 time sub-window(s) and the frequency-domain resources occupied by the first radio signal.

In one embodiment, the first radio signal carries the first signaling.

In one embodiment, the first radio signal includes the first signaling.

In one embodiment, the first radio signal carries the first signaling and data transmission other than the first signaling.

Embodiment 7

Figure 7:
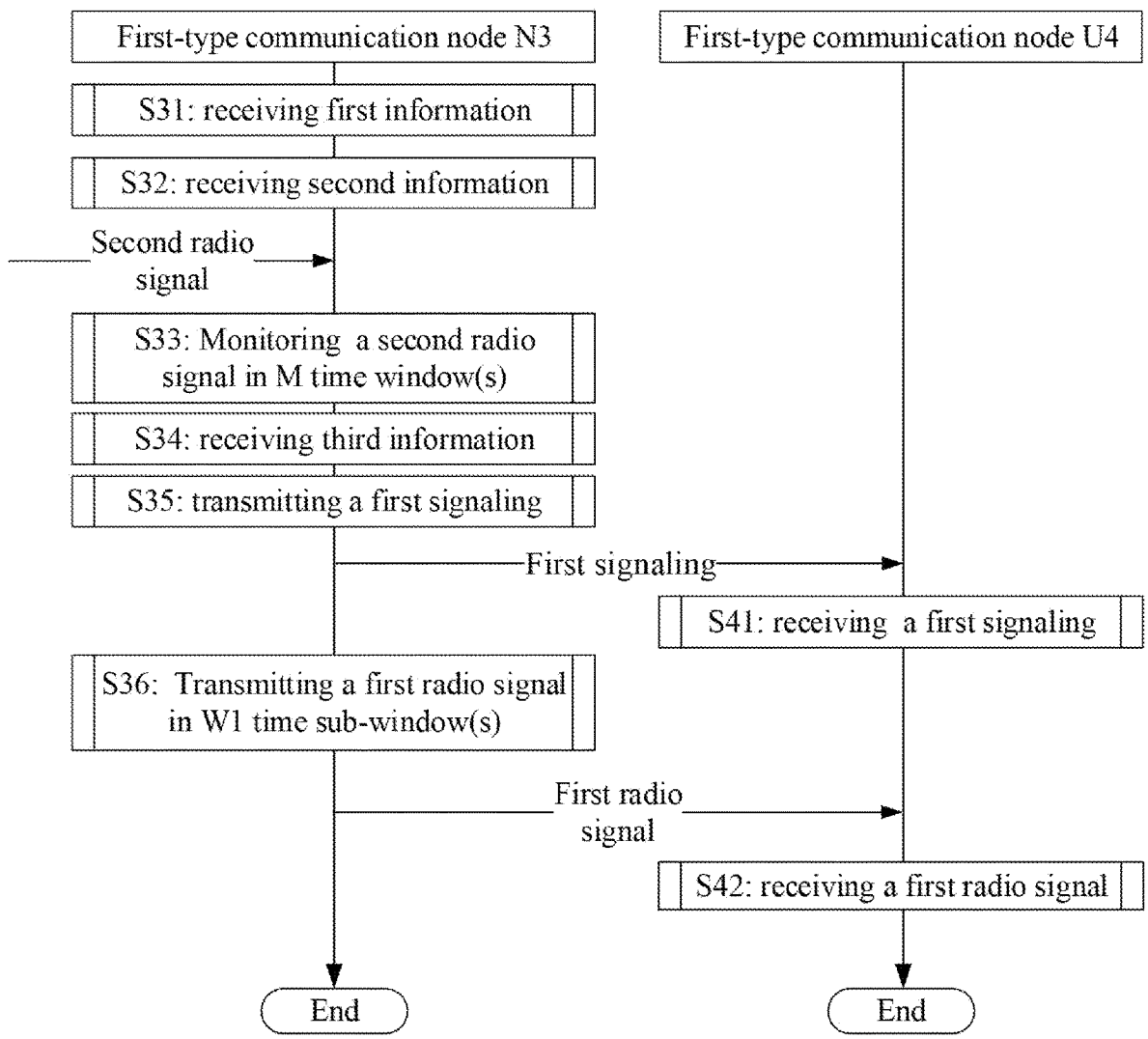
FIG. 7 is a flowchart of transmission of a radio signal according to another embodiment of the disclosure.

Embodiment 7 illustrates an example of a flowchart of transmission of a radio signal according to another embodiment of the disclosure, as shown in FIG. 7. In FIG. 7, one first-type communication node N3 performs communication with another first-type communication node U4. The first-type communication node N3 is out of coverage of a cell.

The first-type communication node N3 receives first information in S31, receives second information in S32, monitors a second radio signal in M time window(s) in S33, receives third information in S34, transmits a first signaling in S35, and transmits a first radio signal in W1 time sub-window(s) in S36.

The first-type communication node U4 receives a first signaling in S41, and receives a first radio signal in S42.

In Embodiment 7, the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; each of the W1 time sub-window(s) is one of the W candidate time sub-window(s); the third information is used for determining the W1 time sub-window(s) out of the W candidate time sub-window(s) and frequency-domain resources occupied by the first radio signal, the first signaling is used for indicating the W1 time sub-window(s) and the frequency-domain resources occupied by the first radio signal, and the first signaling is transmitted via a first air interface; a monitor of the second radio signal assumes that there are time-domain resources reserved to a radio signal other than the first radio signal within X1 candidate time window(s) out of the X candidate time window(s), and the X1 is a non-negative integer not greater than the X; when the second radio signal is detected in one of the M time window(s), a time-domain position of the second radio signal is used for determining the X1 candidate time window(s) out of the X candidate time window(s); an end time of any one of the M time window(s) is not later than a start time of any one of the X candidate time window(s), and the M is a positive integer In one embodiment, any two of the Y candidate time sub-windows are orthogonal, the Y candidate time sub-windows are arranged orderly according to time sequence, and the W candidate time sub-window(s) is(are) W consecutively arranged candidate time sub-window(s) among the Y candidate time sub-windows.

In one embodiment, the W candidate time sub-window(s) belong(s) to one of Q candidate time sub-window sets, and any one of the Q candidate time sub-window sets includes a positive integer number of candidate time sub-window(s) out of the Y candidate time sub-window(s); the second information is used for determining out of the Q candidate time sub-window sets a candidate time sub-window set to which the W candidate time sub-window(s) belong(s); the Q candidate time sub-window sets include two candidate time sub-window sets orthogonal to each other, candidate time sub-windows in the two candidate time sub-window sets orthogonal to each other constitute one of the Q candidate time sub-window sets, and the Q is a positive integer greater than 2.

In one embodiment, a monitor of the second radio signal assumes that there are time-domain resources reserved to a radio signal other than the first radio signal within Y1 candidate time sub-window(s) among the Y candidate time sub-window(s), and the Y1 is a non-negative integer not greater than the Y; when the second radio signal is detected in a target time window, a time-domain position of time-domain resources occupied by the second radio signal in the target time window is used for determining the Y1 candidate time sub-window(s) out of the Y candidate time sub-window(s), and the target time window is one of the M time window(s).

Embodiment 8

Figure 8:
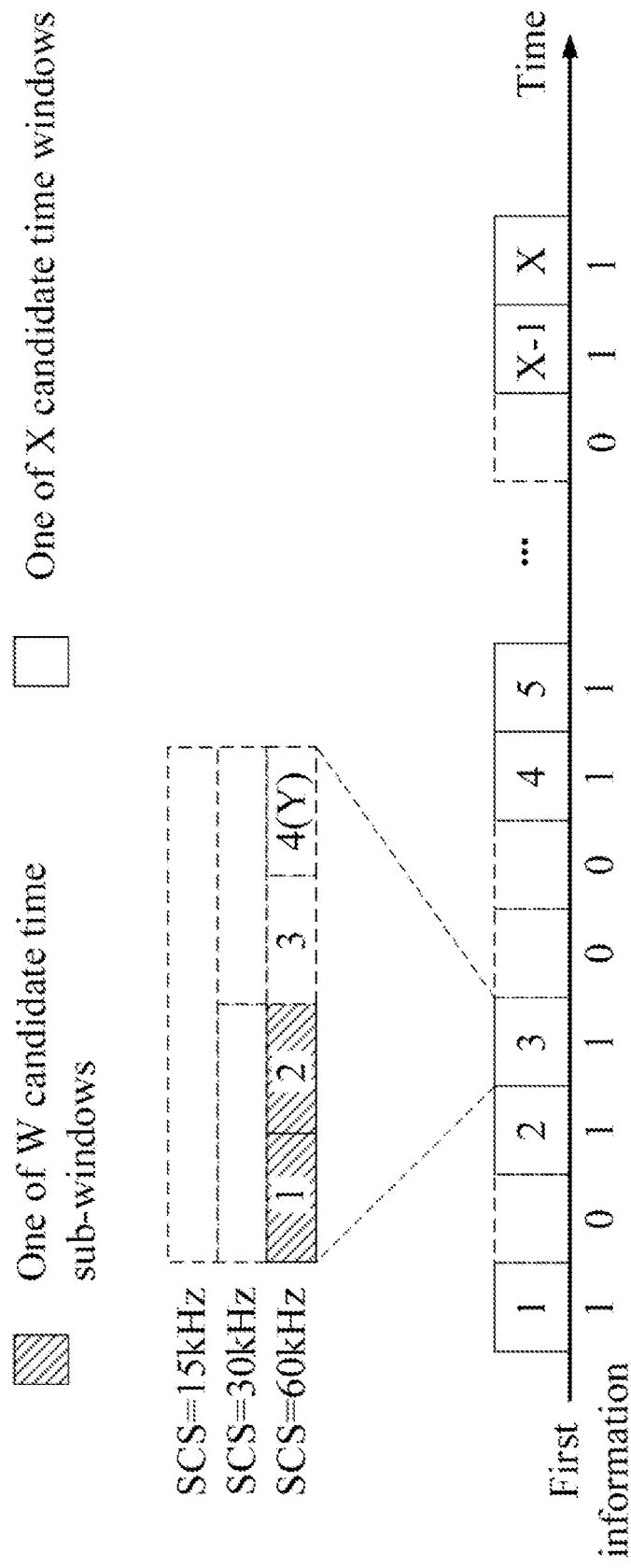
FIG. 8 is a diagram illustrating a relationship between X candidate time windows and W candidate time sub-windows according to one embodiment of the disclosure.

Embodiment 8 illustrates an example of a diagram of a relationship between X candidate time windows and W candidate time sub-windows according to one embodiment of the disclosure, as shown in FIG. 8. In FIG. 8, the horizontal axis represents time, each blank rectangle represents one of X candidate time windows, and each rectangle filled by slashes represents one of W candidate time sub-windows.

In Embodiment 8, the first information in the disclosure is used for determining X candidate time windows, any one of the X candidate time windows has a time length equal to a first time length, the first time length is fixed, and the X is a positive integer; for a subcarrier spacing of a subcarrier occupied by the first radio signal in the disclosure, one of the X candidate time windows includes Y candidate time sub-windows, and the Y is related to the subcarrier spacing of the subcarrier occupied by the first radio signal; the second information in the disclosure is used for indicating W candidate time sub-windows out of the Y candidate time sub-windows, the W is a positive integer, and the Y is a positive integer not less than the W.

In one embodiment, the first information includes one bitmap, each bit in the bitmap represents one of K candidate time windows, each bit "1" in the bitmap indicates that a candidate time window represented by the bit "1" is one of the X candidate time windows, and each bit "0" in the bitmap indicates that a candidate time window represented by the bit "0" is a candidate time window other than the X candidate time windows, wherein the K is a positive integer.

In one embodiment, the first information includes one bitmap, each bit in the bitmap represents one of K candidate time windows, each bit "0" in the bitmap indicates that a candidate time window represented by the bit "0" is one of the X candidate time windows, and each bit "1" in the bitmap indicates that a candidate time window represented by the bit "1" is a candidate time window other than the X candidate time windows, wherein the K is a positive integer.

Embodiment 9

Figure 9:
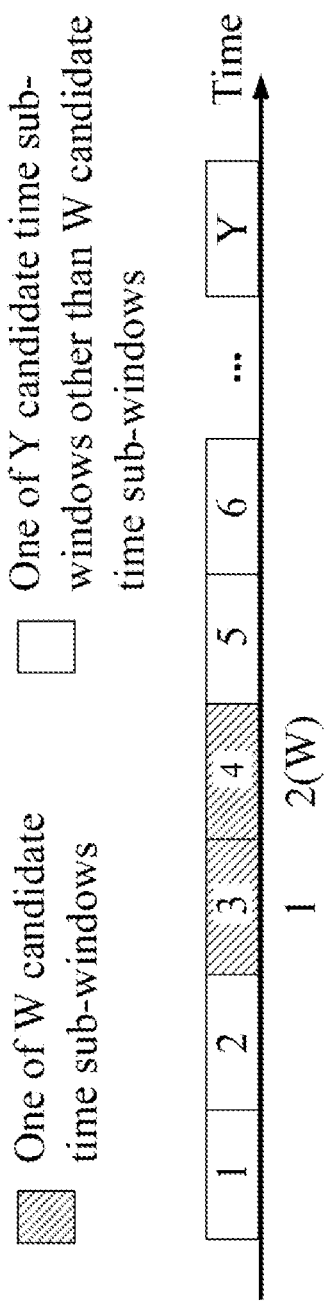
FIG. 9 is a diagram illustrating a relationship between W candidate time sub-windows and Y candidate time sub-windows according to one embodiment of the disclosure.

Embodiment 9 illustrates an example of a diagram of a relationship between W candidate time sub-windows and Y candidate time sub-windows according to one embodiment of the disclosure, as shown in FIG. 9. In FIG. 9, the horizontal axis represents time, each blank rectangle represents one of Y candidate time sub-windows other than W candidate time sub-windows, and each rectangle filled by slashes represents one of W candidate time sub-windows.

In Embodiment 9, any two of the Y candidate time sub-windows in the disclosure are orthogonal, the Y candidate time sub-windows are arranged orderly according to time sequence, and the W candidate time sub-windows in the disclosure are W consecutively arranged candidate time sub-windows among the Y candidate time sub-windows.

In one embodiment, the phrase that any two of the Y candidate time sub-windows are orthogonal refers that: any two of the Y candidate time sub-windows include non-overlapping time-domain resources, wherein the Y is greater than 1.

In one embodiment, the phrase that any two of the Y candidate time sub-windows are orthogonal refers that: no time-domain resource belongs simultaneously to one of the Y candidate time sub-windows and another one of the Y candidate time sub-windows, wherein the Y is greater than 1.

In one embodiment, the phrase that any two of the Y candidate time sub-windows are orthogonal refers that: no time-domain resource belongs to two of the Y candidate time sub-windows simultaneously, wherein the Y is greater than 1.

In one embodiment, the Y candidate time sub-windows occupy consecutive time-domain resources.

In one embodiment, the Y candidate time sub-windows occupy discrete time-domain resources.

In one embodiment, if the Y is greater than 1, no time-domain resource other than the Y candidate time sub-windows is located between two of the Y candidate time sub-windows.

In one embodiment, if the Y is greater than 1, one time-domain resource other than the Y candidate time sub-windows is located between two of the Y candidate time sub-windows.

In one embodiment, the Y candidate time sub-windows are head-to-end connected two by two in time sequence in time domain.

In one embodiment, the Y candidate time sub-windows occupy in time domain a positive integer number of OFDM symbols consecutive in time sequence.

In one embodiment, the Y candidate time sub-windows occupy in time domain a positive integer number of OFDM symbols discrete in time sequence.

In one embodiment, if the Y is greater than 1, no OFDM symbol other than the Y candidate time sub-windows is located between two of the Y candidate time sub-windows.

In one embodiment, if the Y is greater than 1, one OFDM symbol other than the Y candidate time sub-windows is located between two of the Y candidate time sub-windows.

In one embodiment, if the Y candidate time sub-windows occupy consecutive time-domain resources, the phrase that the W candidate time sub-windows are W consecutively arranged candidate time sub-windows among the Y candidate time sub-windows refers that: the W candidate time sub-windows are W candidate time sub-windows consecutive in time domain among the Y candidate time sub-windows.

In one embodiment, the W is equal to the Y.

In one embodiment, the phrase that the Y candidate time sub-windows are arranged orderly according to time sequence and the W candidate time sub-windows are W consecutively arranged candidate time sub-windows among the Y candidate time sub-windows refers that: the Y candidate time sub-windows are arranged in chronological order, and the W candidate time sub-windows are W consecutively arranged candidate time sub-windows among the Y candidate time sub-windows.

In one embodiment, the phrase that the Y candidate time sub-windows are arranged orderly according to time sequence and the W candidate time sub-windows are W consecutively arranged candidate time sub-windows among the Y candidate time sub-windows refers that: the Y candidate time sub-windows are indexed orderly according to time sequence, and the W candidate time sub-windows are W consecutively indexed candidate time sub-windows among the Y candidate time sub-windows.

Embodiment 10

Figure 10:
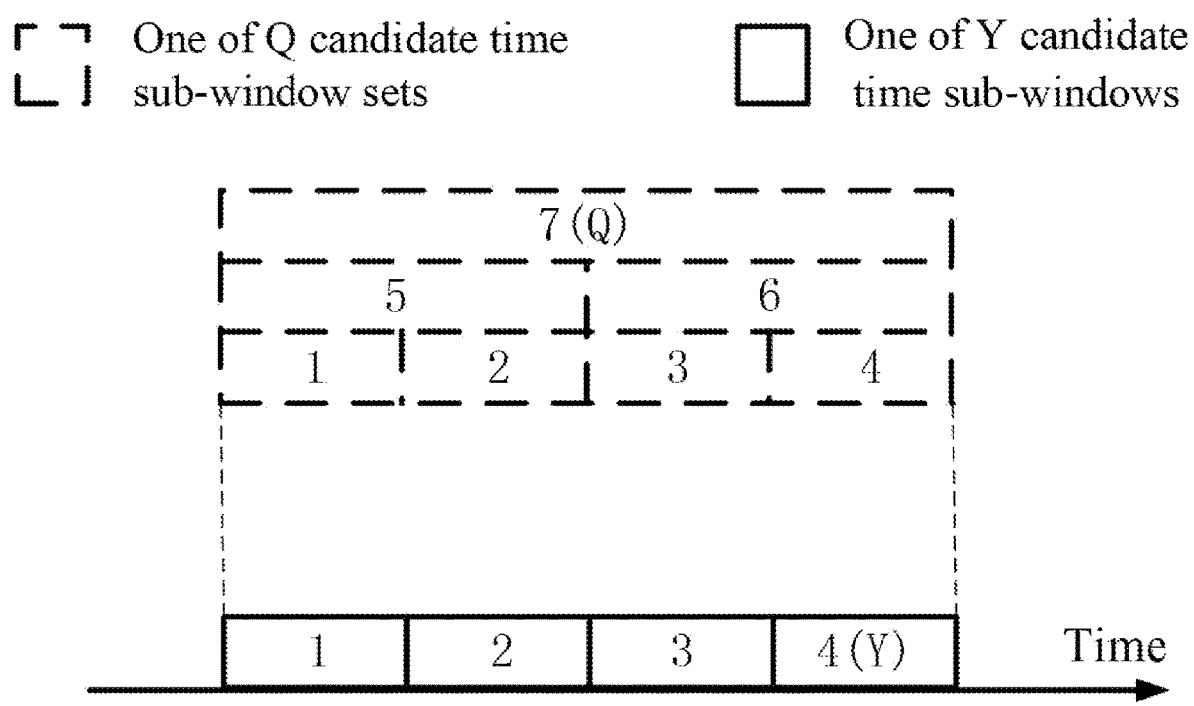
FIG. 10 is a diagram illustrating Q candidate time sub-window sets according to one embodiment of the disclosure.

Embodiment 10 illustrates a diagram of Q candidate time sub-window sets according to one embodiment of the disclosure, as shown in FIG. 10. In FIG. 10, the horizontal axis represents time, each solid-line rectangle represents one of Y candidate time sub-windows, and each dash-line rectangle represents one of Q candidate time sub-window sets.

In Embodiment 10, wherein the W candidate time sub-windows in the disclosure belong to one of Q candidate time sub-window sets, and any one of the Q candidate time sub-window sets includes a positive integer number of candidate time sub-windows out of the Y candidate time sub-windows in the disclosure; the second information in the disclosure is used for determining out of the Q candidate time sub-window sets a candidate time sub-window set to which the W candidate time sub-windows belong; the Q candidate time sub-window sets include two candidate time sub-window sets orthogonal to each other, candidate time sub-windows in the two candidate time sub-window sets orthogonal to each other constitute one of the Q candidate time sub-window sets, and the Q is a positive integer greater than 2.

In one embodiment, the W candidate time sub-windows constitute one of the Q candidate time sub-window sets.

In one embodiment, the candidate time sub-window set among the Q candidate time sub-window sets to which the W candidate time sub-windows belong further include candidate time sub-windows other than the W candidate time sub-windows.

In one embodiment, the candidate time sub-window set among the Q candidate time sub-window sets to which the W candidate time sub-windows belong includes the W candidate time sub-windows only.

In one embodiment, candidate time sub-windows other than the W candidate time sub-windows also belong to the candidate time sub-window set among the Q candidate time sub-window sets to which the W candidate time sub-windows belong.

In one embodiment, no candidate time sub-window other than the W candidate time sub-windows belongs to the candidate time sub-window set among the Q candidate time sub-window sets to which the W candidate time sub-windows belong.

In one embodiment, any one of the Q candidate time sub-window sets includes a positive integer number of candidate time sub-windows consecutive in time domain among the Y candidate time wub-windows.

In one embodiment, the Y candidate time wub-windows are arranged in turn in time sequence, and any one of the Q candidate time sub-window sets includes a positive integer number of consecutively arranged candidate time sub-windows among the Y candidate time sub-windows.

In one embodiment, any one of the Q candidate time sub-window sets includes a positive integer number of candidate time sub-windows discrete in time domain among the Y candidate time sub-windows.

In one embodiment, the phrase that the second information is used for determining out of the Q candidate time sub-window sets a candidate time sub-window set to which the W candidate time sub-windows belong refers that: the second information is used by the first-type communication node to determine out of the Q candidate time sub-window sets a candidate time sub-window set to which the W candidate time sub-windows belong.

In one embodiment, the phrase that the second information is used for determining out of the Q candidate time sub-window sets a candidate time sub-window set to which the W candidate time sub-windows belong refers that: the second information is used for indicating directly out of the Q candidate time sub-window sets a candidate time sub-window set to which the W candidate time sub-windows belong.

In one embodiment, the phrase that the second information is used for determining out of the Q candidate time sub-window sets a candidate time sub-window set to which the W candidate time sub-windows belong refers that: the second information is used for indicating indirectly out of the Q candidate time sub-window sets a candidate time sub-window set to which the W candidate time sub-windows belong.

In one embodiment, the phrase that the second information is used for determining out of the Q candidate time sub-window sets a candidate time sub-window set to which the W candidate time sub-windows belong refers that: the second information is used for indicating explicitly out of the Q candidate time sub-window sets a candidate time sub-window set to which the W candidate time sub-windows belong.

In one embodiment, the phrase that the second information is used for determining out of the Q candidate time sub-window sets a candidate time sub-window set to which the W candidate time sub-windows belong refers that: the second information is used for indicating implicitly out of the Q candidate time sub-window sets a candidate time sub-window set to which the W candidate time sub-windows belong.

In one embodiment, the phrase that the second information is used for determining out of the Q candidate time sub-window sets a candidate time sub-window set to which the W candidate time sub-windows belong refers that: the Q candidate time sub-window sets are indexed orderly, and the second information indicates an index of a candidate time sub-window set to which the W candidate time sub-windows belong in the Q candidate time sub-window sets.

In one embodiment, the phrase that the second information in the disclosure is used for indicating the W candidate time sub-windows out of the Y candidate time sub-windows refers that: the second information is used for indicating out of the Q candidate time sub-window sets a candidate time sub-window set to which the W candidate time sub-windows belong, and then determining the W candidate time sub-windows from the candidate time sub-window set to which the W candidate time sub-windows belong.

In one embodiment, the phrase that the second information in the disclosure is used for indicating the W candidate time sub-windows out of the Y candidate time sub-windows refers that: the second information is used for indicating out of the Q candidate time sub-window sets a candidate time sub-window set to which the W candidate time sub-windows belong, and the candidate time sub-window set among the Q candidate time sub-window sets to which the W candidate time sub-windows belong includes the W candidate time sub-windows only.

In one embodiment, the Q candidate time sub-window sets are acquired from the Y candidate time sub-windows according to a nested structure respectively.

In one embodiment, the Q candidate time sub-window sets are composed by the Y candidate time sub-windows according to a nested structure respectively.

In one embodiment, the Q candidate time sub-window sets meet a nested structure.

In one embodiment, a first candidate time sub-window set is one of the Q candidate time sub-window sets, the first candidate time sub-window set includes R1 candidate time sub-windows out of the Y candidate time sub-windows, the first candidate time sub-window set consists of candidate time sub-windows in a second candidate time sub-window set and in a third candidate time sub-window set, the second candidate time sub-window set and the third candidate time sub-window set are two candidate time sub-window sets orthogonal to each other among the Q candidate time sub-window sets, the second candidate time sub-window set includes ½ R1 candidate time sub-windows among the Y candidate time sub-windows, the third candidate time sub-window set includes ½ R1 candidate time sub-windows among the Y candidate time sub-windows, and the R1 is a positive integer multiple of 2.

In one embodiment, the phrase that two candidate time sub-window sets orthogonal to each other among the Q candidate time sub-window sets refers that: no candidate time sub-window belongs simultaneously to the two candidate time sub-window sets orthogonal to each other among the Q candidate time sub-window sets.

In one embodiment, the phrase that two candidate time sub-window sets orthogonal to each other among the Q candidate time sub-window sets refers that: no candidate time sub-window belongs simultaneously to one and the other of the two candidate time sub-window sets orthogonal to each other among the Q candidate time sub-window sets.

Embodiment 11

Figure 11:
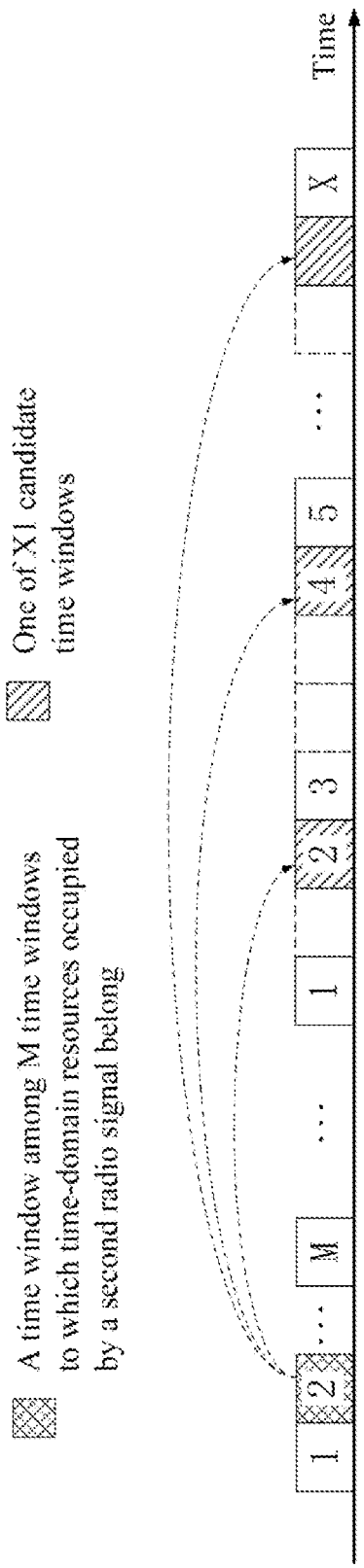
FIG. 11 is a diagram illustrating a relationship between X1 candidate time windows and M time windows according to one embodiment of the disclosure.

Embodiment 11 illustrates an example of a diagram of a relationship between X1 candidate time windows and M time windows according to one embodiment of the disclosure, as shown in FIG. 11. In FIG. 11, the horizontal axis represents time, a rectangle filled by cross lines represents a time window among M time windows to which time-domain resources occupied by a second radio signal belong, and each rectangle filled by slashes represents one of X1 candidate time windows.

In Embodiment 11, a monitor of the second radio signal in the disclosure assumes that within X1 candidate time windows among the X candidate time windows in the disclosure there are time-domain resources reserved to a radio signal other than the first radio signal, and the X1 is a non-negative integer not greater than the X; when the second radio signal is detected in one of the M time windows, a time-domain position of the second radio signal is used for determining the X1 candidate time windows out of the X candidate time windows; an end time of any one of the M time windows is not later than a start time of any one of the X candidate time windows, and the M is a positive integer.

In one embodiment, the monitoring includes decoding the second radio signal.

In one embodiment, the monitoring includes channel decoding the second radio signal.

In one embodiment, the monitoring includes reading an information bit carried by the second radio signal.

In one embodiment, the monitoring includes an energy detection of the second radio signal.

In one embodiment, the monitoring includes a measurement of the second radio signal.

In one embodiment, the monitoring includes a measurement of a Received Signal Strength Indicator (RSSI) of the second radio signal.

In one embodiment, the monitoring includes a blind decoding of a subcarrier spacing of a subcarrier occupied by the second radio signal.

In one embodiment, the monitoring includes a blind decoding of a numerology employed by the second radio signal.

In one embodiment, the monitoring includes a blind decoding of a number of OFDM symbols occupied by the second radio signal.

In one embodiment, the monitoring includes a blind decoding of a length of a CP of OFDM symbols occupied by the second radio signal.

In one embodiment, the second radio signal caries part or all fields in one SCI.

In one embodiment, the second radio signal caries part or all fields in one SCI, and the monitoring includes reading an SCI carried by the second radio signal.

In one embodiment, the second radio signal is transmitted through a PSCCH.

In one embodiment, the second radio signal carries one TB.

In one embodiment, the second radio signal is generated by one TB.

In one embodiment, the second radio signal is transmitted through an SL-SCH.

In one embodiment, the second radio signal is transmitted through a PSSCH.

In one embodiment, the second radio signal is one reference signal.

In one embodiment, the second radio signal includes a Demodulation Reference Signal (DMRS).

In one embodiment, the second radio signal is a DMRS of PSSCH.

In one embodiment, a subcarrier spacing of a subcarrier occupied by the second radio signal is the same as a subcarrier spacing of a subcarrier occupied by the first radio signal. In one embodiment, a subcarrier spacing of a subcarrier occupied by the second radio signal is different from a subcarrier spacing of a sub carrier occupied by the first radio signal.

In one embodiment, a monitor of the second radio signal cannot assume that a subcarrier spacing of a subcarrier occupied by the second radio signal is the same as a subcarrier spacing of a subcarrier occupied by the first radio signal.

In one embodiment, a monitor of the second radio signal can assume that a subcarrier spacing of a subcarrier occupied by the second radio signal is the same as a subcarrier spacing of a subcarrier occupied by the first radio signal.

In one embodiment, a subcarrier spacing of a subcarrier occupied by the second radio signal is one of {15 kHz, 30 kHz, 60 kHz, 120 kHz, 240 kHz, 480 kHz, 960 kHz}.

In one embodiment, a monitor of the second radio signal cannot assume that the second radio signal and the first radio signal employ a same numerology.

In one embodiment, a monitor of the second radio signal can assume that the second radio signal and the first radio signal employ a same numerology.

In one embodiment, the phrase that the second radio signal is detected in one of the M time windows refers that: the second radio signal is successfully decoded when being monitored.

In one embodiment, the phrase that the second radio signal is detected in one of the M time windows refers that: the second radio signal is channel decoded when being monitored, and a Cyclic Redundancy Check (CRC) validation for the second radio signal is passed.

In one embodiment, the phrase that the second radio signal is detected in one of the M time windows refers that: an energy detection of the second radio signal exceeds a predefined threshold when the second radio signal is being monitored.

In one embodiment, the phrase that the second radio signal is detected in one of the M time windows refers that: a measurement of RSSI of the second radio signal exceeds a predefined threshold when the second radio signal is being monitored.

In one embodiment, the second radio signal is transmitted through a sidelink.

In one embodiment, the second radio signal is transmitted via a PC5 interface.

In one embodiment, any two of the M time windows are orthogonal in time domain, wherein the M is greater than 1.

In one embodiment, any two of the M time windows have an equal time length.

In one embodiment, any one of the M time windows has a time length equal to the first time length.

In one embodiment, if the second radio signal is transmitted, the second radio signal occupies all time-domain resources of one of the M time windows at the first-type communication node.

In one embodiment, if the second radio signal is transmitted, the second radio signal occupies partial time-domain resources of one of the M time windows at the first-type communication node.

In one embodiment, the phrase that monitoring the second radio signal in the M time windows refers that: monitoring the second radio signal in each of the M time windows.

In one embodiment, each of the M time windows includes a positive integer number of time sub-windows, the phrase that monitoring the second radio signal in the M time windows refers that: monitoring the second radio signal in each time sub-window included in each of the M time windows, and each time sub-window included in each of the M time windows has a time length related to a subcarrier spacing of a subcarrier occupied by the second radio signal assumed by a monitor of the second radio signal.

In one embodiment, each of the M time windows includes a positive integer number of time sub-windows, the phrase that monitoring the second radio signal in the M time windows refers that: monitoring the second radio signal in each time sub-window included in each of the M time windows, and each time sub-window included in each of the M time windows has a time length related to a length of a CP of a multicarrier symbol occupied by the second radio signal assumed by a monitor of the second radio signal.

In one embodiment, each of the M time windows includes a positive integer number of time sub-windows, the phrase that monitoring the second radio signal in the M time windows refers that: monitoring the second radio signal in each time sub-window included in each of the M time windows, and each time sub-window included in each of the M time windows has a time length related to a numerology of a multicarrier symbol occupied by the second radio signal assumed by a monitor of the second radio signal.

In one embodiment, each of the M time windows includes a positive integer number of time sub-windows, the phrase that monitoring the second radio signal in the M time windows refers that: monitoring the second radio signal in each time sub-window included in each of the M time windows, and each time sub-window included in each of the M time windows has a time length related to a number of a multicarrier symbols occupied by the second radio signal assumed by a monitor of the second radio signal.

In one embodiment, time-domain resources in the X1 candidate time windows reserved to a radio signal other than the first radio signal cannot be used for transmission of the first radio signal.

In one embodiment, the phrase that a time-domain position of the second radio signal is used for determining the X1 candidate time windows out of the X candidate time windows refers that: a time-domain position of the second radio signal is used by the first-type communication node to determine the X1 candidate time windows out of the X candidate time windows.

In one embodiment, the phrase that a time-domain position of the second radio signal is used for determining the X1 candidate time windows out of the X candidate time windows refers that: a time-domain position of the second radio signal is used by the first-type communication node to determine the X1 candidate time windows out of the X candidate time windows according to a specific mapping relationship.

In one embodiment, the phrase that a time-domain position of the second radio signal is used for determining the X1 candidate time windows out of the X candidate time windows refers that: a time-domain position of the second radio signal is used by the first-type communication node to determine the X1 candidate time windows out of the X candidate time windows according to a specific functional relationship.

In one embodiment, a monitor of the second radio signal assumes that there are P periodic radio signals, and the second radio signal is one of the P periodic radio signals; the phrase that a time-domain position of the second radio signal is used for determining the X1 candidate time windows out of the X candidate time windows refers that: each of the X1 candidate time windows includes time-domain resources for one of the P periodic radio signals, and the monitor of the second radio signal determines the X1 candidate time windows to which time-domain resources for the P periodic radio signals belong according to a time-domain position of the second radio signal.

In one embodiment, a time-domain position of the second radio signal refers to: a time-domain position of a slot occupied by the second radio signal.

In one embodiment, a time-domain position of the second radio signal refers to: a time-domain position of a subframe occupied by the second radio signal.

In one embodiment, a time-domain position of the second radio signal refers to: a time-domain position of a sub-slot occupied by the second radio signal.

In one embodiment, a time-domain position of the second radio signal refers to: an index of a slot occupied by the second radio signal.

In one embodiment, a time-domain position of the second radio signal refers to: an index of a subframe occupied by the second radio signal.

In one embodiment, a time-domain position of the second radio signal refers to: an index of a sub-slot occupied by the second radio signal.

In one embodiment, if the second radio signal is not detected in one of the M time windows, the X1 is equal to 0.

In one embodiment, if the second radio signal is not detected in one of the M time windows, the X1 is greater than 0.

In one embodiment, the method further includes:
receiving a second signaling.
Herein, the second signaling is used for indicating time-frequency resources occupied by the second radio signal, and the second signaling is transmitted via a PC5 interface.

Embodiment 12

Figure 12:
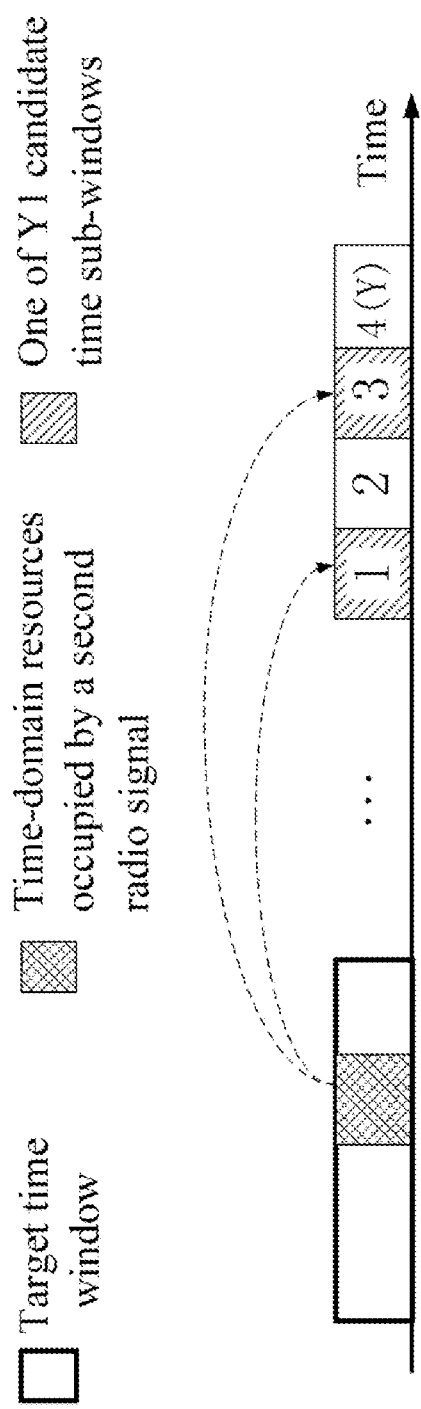
FIG. 12 is a diagram illustrating a relationship between Y1 candidate time sub-windows and a target time window according to one embodiment of the disclosure.

Embodiment 12 illustrates an example of a diagram of a relationship between Y1 candidate time sub-windows and a target time window according to one embodiment of the disclosure, as shown in FIG. 12. In FIG. 12, the horizontal axis represents time, a rectangle filled by cross lines represents time-domain resources occupied by a second radio signal, a rectangle with a bold frame represents a target time window, and each rectangle filled by slashes represents one of Y1 candidate time sub-windows.

In Embodiment 12, a monitor of the second radio signal in the disclosure assumes that within Y1 candidate time sub-windows out of the Y candidate time sub-windows in the disclosure there are time-domain resources reserved to a radio signal other than the first radio signal, and the Y1 is a non-negative integer not greater than the Y; when the second radio signal is detected in a target time window, a time-domain position of time-domain resources occupied by the second radio signal in the target time window is used for determining the Y1 candidate time sub-windows out of the Y candidate time sub-windows, and the target time window is one of the M time windows in the disclosure.

In one embodiment, time-domain resources in the Y1 candidate time sub-windows reserved to a radio signal other than the first radio signal cannot be used for transmission of the first radio signal.

In one embodiment, a time-domain position of time-domain resources occupied by the second radio signal in the target time window refers to: a time-domain position of a slot to which time-domain resources occupied by the second radio signal belong in the target time window.

In one embodiment, a time-domain position of time-domain resources occupied by the second radio signal in the target time window refers to: a time-domain position of a sub-slot to which time-domain resources occupied by the second radio signal belong in the target time window.

In one embodiment, a time-domain position of time-domain resources occupied by the second radio signal in the target time window refers to: a time-domain position of a mini-slot to which time-domain resources occupied by the second radio signal belong in the target time window.

In one embodiment, a time-domain position of time-domain resources occupied by the second radio signal in the target time window refers to: a time-domain position of a multicarrier symbol occupied by the second radio signal in the target time window.

In one embodiment, a time-domain position of time-domain resources occupied by the second radio signal in the target time window refers to: an index of a slot to which time-domain resources occupied by the second radio signal belong in the target time window.

In one embodiment, a time-domain position of time-domain resources occupied by the second radio signal in the target time window refers to: an index of a sub-slot to which time-domain resources occupied by the second radio signal belong in the target time window.

In one embodiment, a time-domain position of time-domain resources occupied by the second radio signal in the target time window refers to: an index of a mini-slot to which time-domain resources occupied by the second radio signal belong in the target time window. In one embodiment, a time-domain position of time-domain resources occupied by the second radio signal in the target time window refers to: an index of a multicarrier symbol occupied by the second radio signal in the target time window.

In one embodiment, the phrase that a time-domain position of time-domain resources occupied by the second radio signal in the target time window is used for determining the Y1 candidate time sub-windows out of the Y candidate time sub-windows refers that: a time-domain position of time-domain resources occupied by the second radio signal in the target time window is used by the first-type communication node to determine the Y1 candidate time sub-windows out of the Y candidate time sub-windows.

In one embodiment, the phrase that a time-domain position of time-domain resources occupied by the second radio signal in the target time window is used for determining the Y1 candidate time sub-windows out of the Y candidate time sub-windows refers that: a time-domain position of time-domain resources occupied by the second radio signal in the target time window is used by the first-type communication node to determine the Y1 candidate time sub-windows out of the Y candidate time sub-windows according to a specific mapping relationship.

In one embodiment, the phrase that a time-domain position of time-domain resources occupied by the second radio signal in the target time window is used for determining the Y1 candidate time sub-windows out of the Y candidate time sub-windows refers that: a time-domain position of time-domain resources occupied by the second radio signal in the target time window is used by the first-type communication node to determine the Y1 candidate time sub-windows out of the Y candidate time sub-windows according to a specific functional relationship.

In one embodiment, the phrase that a time-domain position of time-domain resources occupied by the second radio signal in the target time window is used for determining the Y1 candidate time sub-windows out of the Y candidate time sub-windows refers that: a start position of time-domain resources occupied by the second radio signal in the target time window is the same as a start position of one of the Y1 candidate time sub-windows in a candidate time window to which the Y candidate time sub-windows belong.

In one embodiment, the phrase that a time-domain position of time-domain resources occupied by the second radio signal in the target time window is used for determining the Y1 candidate time sub-windows out of the Y candidate time sub-windows refers that: for a given numerology employed by the second radio signal, an index of a slot to which time-domain resources occupied by the second radio signal belong in the target time window is the same as an index of one of the Y1 candidate time sub-windows in a candidate time window to which the Y candidate time sub-windows belong.

In one embodiment, the phrase that a time-domain position of time-domain resources occupied by the second radio signal in the target time window is used for determining the Y1 candidate time sub-windows out of the Y candidate time sub-windows refers that: for a given subcarrier spacing of a subcarrier occupied by the second radio signal, an index of a slot to which time-domain resources occupied by the second radio signal belong in the target time window is the same as an index of one of the Y1 candidate time sub-windows in a candidate time window to which the Y candidate time sub-windows belong.

In one embodiment, the phrase that a time-domain position of time-domain resources occupied by the second radio signal in the target time window is used for determining the Y1 candidate time sub-windows out of the Y candidate time sub-windows refers that: for a given numerology employed by the second radio signal, an index of a mini-slot to which time-domain resources occupied by the second radio signal belong in the target time window is the same as an index of one of the Y1 candidate time sub-windows in a candidate time window to which the Y candidate time sub-windows belong.

In one embodiment, the phrase that a time-domain position of time-domain resources occupied by the second radio signal in the target time window is used for determining the Y1 candidate time sub-windows out of the Y candidate time sub-windows refers that: for a given subcarrier spacing of a subcarrier occupied by the second radio signal, an index of a mini-slot to which time-domain resources occupied by the second radio signal belong in the target time window is the same as an index of one of the Y1 candidate time sub-windows in a candidate time window to which the Y candidate time sub-windows belong.

In one embodiment, the Y1 is equal to 1.

In one embodiment, the Y1 is greater than 1.

In one embodiment, a monitor of the second radio signal assumes that there are R periodic radio signals occurring in the target time window, and the second radio signal is one of the R periodic radio signals; the phrase that a time-domain position of time-domain resources occupied by the second radio signal in the target time window is used for determining the Y1 candidate time sub-windows from the Y candidate time sub-windows refers that: each of the Y1 candidate time windows includes time-domain resources for one of the R periodic radio signals, and the monitor of the second radio signal determines the Y1 candidate time windows to which time-domain resources for the R periodic radio signals belong according to a time-domain position of time-domain resources occupied by the second radio signal in the target time window.

Embodiment 13

Figure 13:
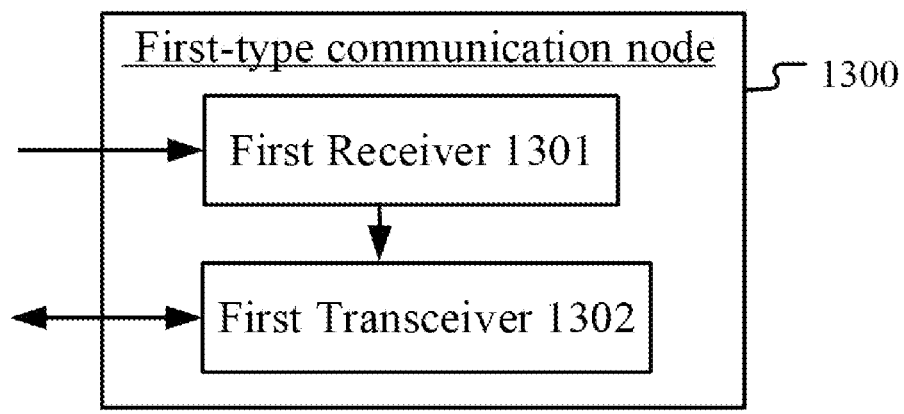
FIG. 13 is a structure block diagram illustrating a processing device in a first-type communication node according to one embodiment of the disclosure.

Embodiment 13 illustrates an example of a structure block diagram of a processing device in a first-type communication node according to one embodiment, as shown in FIG. 13. In FIG. 13, the processing device 1300 in the first-type communication node includes a first receiver 1301 and a first transceiver 1302. The first receiver 1301 includes the transmitter/receiver 456 (including the antenna 460), the receiving processor 452 and the controller/processor 490 illustrated in FIG. 4 of the disclosure; or the first receiver 1301 includes the controller/processor 540, the receiving processor 512 and/or the transmitting processor 515 illustrated in FIG. 5 of the disclosure; the first transceiver 1302 includes the transmitter/receiver 456 (including the antenna 460), the receiving processor 452, the transmitting processor 455 and the controller/processor 490 illustrated in FIG. 4 of the disclosure; or the first transceiver 1302 includes the controller/processor 540, the receiving processor 512, the transmitting processor 515 and the transmitter/receiver 516 (including the antenna 520) illustrated in FIG. 5 of the disclosure.

In Embodiment 13, the first receiver 1301 receives first information and second information; the first transceiver 1302 transmits a first radio signal in W1 time sub-window(s); wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, any two of the Y candidate time sub-windows are orthogonal, the Y candidate time sub-windows are arranged orderly according to time sequence, and the W candidate time sub-window(s) is(are) W consecutively arranged candidate time sub-window(s) among the Y candidate time sub-windows.

In one embodiment, the W candidate time sub-window(s) belong(s) to one of Q candidate time sub-window sets, and any one of the Q candidate time sub-window sets includes a positive integer number of candidate time sub-window(s) among the Y candidate time sub-window(s); the second information is used for determining from the Q candidate time sub-window sets a candidate time sub-window set to which the W candidate time sub-window(s) belong(s); the Q candidate time sub-window sets include two candidate time sub-window sets orthogonal to each other, candidate time sub-windows in the two candidate time sub-window sets orthogonal to each other constitute one of the Q candidate time sub-window sets, and the Q is a positive integer greater than 2.

In one embodiment, the first receiver 1301 further receives third information, and the first transceiver 1302 further transmits a first signaling; wherein the third information is used for determining the W1 time sub-window(s) from the W candidate time sub-window(s) and frequency-domain resources occupied by the first radio signal, the first signaling is used for indicating the W1 time sub-window(s) and the frequency-domain resources occupied by the first radio signal, and the first signaling is transmitted via a first air interface.

In one embodiment, the first transceiver 1302 further monitors a second radio signal in M time window(s); wherein a monitor of the second radio signal assumes that within X1 candidate time window(s) among the X candidate time window(s) there are time-domain resources reserved to a radio signal other than the first radio signal, and the X1 is a non-negative integer not greater than the X; when the second radio signal is detected in one of the M time window(s), a time-domain position of the second radio signal is used for determining the X1 candidate time window(s) from the X candidate time window(s); an end time of any one of the M time window(s) is not later than a start time of any one of the X candidate time window(s), and the M is a positive integer.

In one embodiment, the first transceiver 1302 further monitors a second radio signal in M time window(s); wherein a monitor of the second radio signal assumes that within X1 candidate time window(s) among the X candidate time window(s) there are time-domain resources reserved to a radio signal other than the first radio signal, and the X1 is a non-negative integer not greater than the X; when the second radio signal is detected in one of the M time window(s), a time-domain position of the second radio signal is used for determining the X1 candidate time window(s) from the X candidate time window(s); an end time of any one of the M time window(s) is not later than a start time of any one of the X candidate time window(s), and the M is a positive integer; a monitor of the second radio signal assumes that Y1 candidate time sub-window(s) among the Y candidate time sub-window(s) has(have) time-domain resources reserved to a radio signal other than the first radio signal, and the Y1 is a non-negative integer not greater than the Y; if the second radio signal is detected in a target time window, a time-domain position of time-domain resources occupied by the second radio signal in the target time window is used for determining the Y1 candidate time sub-window(s) from the Y candidate time sub-window(s), and the target time window is one of the M time window(s).

Embodiment 14

Figure 14:
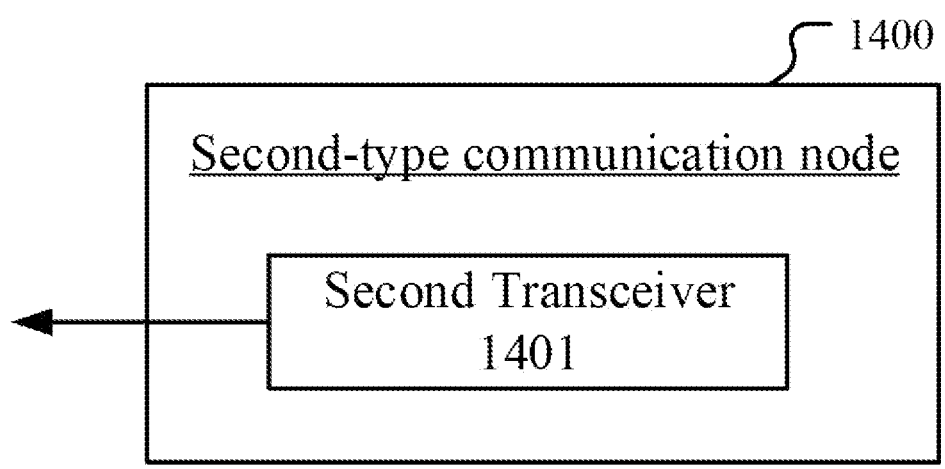
FIG. 14 is a structure block diagram illustrating a processing device in a second-type communication node according to one embodiment of the disclosure.

Embodiment 14 illustrates an example of a structure block diagram of a processing device in a second-type communication node according to one embodiment, as shown in FIG. 14. In FIG. 14, the processing device 1400 in the second-type communication node includes a first transmitter 1401. The first transmitter 1401 includes the transmitter/receiver 416 (including the antenna 420), the transmitting processor 415 and the controller/processor 440 illustrated in FIG. 4 of the disclosure.

In Embodiment 14, the first transmitter 1401 transmits first information and second information; wherein the first information is used for determining X candidate time window(s), any one of the X candidate time window(s) has a time length equal to a first time length, the first time length is fixed, and the X is a positive integer; a first radio signal is transmitted by a receiver of the first information in W1 time sub-window(s), for a subcarrier spacing of a subcarrier occupied by the first radio signal, one of the X candidate time window(s) includes Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s).

In one embodiment, any two of the Y candidate time sub-windows are orthogonal, the Y candidate time sub-windows are arranged orderly according to time sequence, and the W candidate time sub-window(s) is(are) W consecutively arranged candidate time sub-window(s) among the Y candidate time sub-windows.

In one embodiment, the W candidate time sub-window(s) belong(s) to one of Q candidate time sub-window sets, and any one of the Q candidate time sub-window sets includes a positive integer number of candidate time sub-window(s) among the Y candidate time sub-window(s); the second information is used for determining from the Q candidate time sub-window sets a candidate time sub-window set to which the W candidate time sub-window(s) belong(s); the Q candidate time sub-window sets include two candidate time sub-window sets orthogonal to each other, candidate time sub-windows in the two candidate time sub-window sets orthogonal to each other constitute one of the Q candidate time sub-window sets, and the Q is a positive integer greater than 2.

In one embodiment, the first transmitter 1401 further transmits third information; wherein the third information is used for determining the W1 time sub-window(s) from the W candidate time sub-window(s) and frequency-domain resources occupied by the first radio signal.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first-type communication node or UE or terminal in the disclosure includes but not limited to mobile phones, tablet computers, notebooks, network cards, low-power equipment, enhanced MTC (eMTC) equipment, NB-IOT equipment, vehicle-mounted communication equipment, aircrafts, airplanes, unmanned aerial vehicles, telecontrolled aircrafts, and other radio communication equipment. The second-type communication node or base station or network-side equipment in the disclosure includes but not limited to macro-cellular base stations, micro-cellular base stations, home base stations, relay base stations, eNBs, gNBs, TRPs, relay satellites, satellite base stations, air base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first-type communication node for wireless communications, comprising:
    receiving first information and second information; and
    transmitting a first radio signal in W1 time sub-window(s), the first radio signal is transmitted through sidelink;
    wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) comprises Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s); the Y candidate time sub-windows occupy discrete time-domain resources; the first radio signal is transmitted through a Physical Sidelink Shared Channel (PSSCH), the first radio signal carries both sidelink control information and transport block(s); the second information includes one or more fields in one System Information Block (SIB).

2. The method according to claim 1, wherein the second information includes one bitmap, each bit in the bitmap represents one of the Y candidate time sub-window(s), each bit "1" in the bitmap indicates that a candidate time sub-window represented by the bit "1" is one of the W candidate time sub-window(s), and each bit "0" in the bitmap indicates that a candidate time sub-window represented by the bit "0" is a candidate time sub-window other than the W candidate time sub-window(s).

3. The method according to claim 1, wherein each of the Y candidate time sub-window(s) is one slot, any two of the Y candidate time sub-windows have an equal time length, wherein the Y is greater than 1; the Y candidate time sub-windows occupy partial time-domain resources of a candidate time window among the X candidate time window(s) to which the Y candidate time sub-window(s) is belong.

4. The method according to claim 1, further comprising:
    receiving third information; and
    transmitting a first signaling;
    wherein the third information is used for determining the W1 time sub-window(s) out of the W candidate time sub-window(s) and frequency-domain resources occupied by the first radio signal, the first signaling is used for indicating the W1 time sub-window(s) and the frequency-domain resources occupied by the first radio signal, and the first signaling is transmitted via a first air interface.

5. The method according to claim 4, wherein the third information is transmitted via an air interface, a time interval from a reception end time of the third information to a transmission start time of the first signaling has a time length not less than a first threshold, wherein the first threshold is related to a subcarrier spacing of a subcarrier occupied by the first radio signal; the third information includes part or all fields in one DCI signaling.

6. The method according to claim 4, wherein the third information is transmitted via a second air interface, and the second air interface and the first air interface are a Uu interface and a PC5 interface respectively; the first signaling is transmitted through a PSCCH, the first signaling includes part or all fields in one SCI signaling.

7. The method according to claim 1, wherein the first information includes a part of higher layer information and a part of physical layer information; or the first information includes one or more fields in one System Information Block (SIB).

8. The method according to claim 1, wherein for a given subcarrier spacing of a subcarrier occupied by the first radio signal, the Y is further related to a length of a Cyclic Prefix (CP) of an OFDM symbol occupied by the first radio signal.

9. A first-type communication node for wireless communications, comprising:
    a first receiver, to receive first information and second information; and
    a first transceiver, to transmit a first radio signal in W1 time sub-window(s), the first radio signal is transmitted through sidelink;
    wherein the first information is used for determining X candidate time window(s), any one of the X candidate time window(s) has a time length equal to a first time length, the first time length is fixed, and the X is a positive integer; for a subcarrier spacing of a subcarrier occupied by the first radio signal, one of the X candidate time window(s) comprises Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s); the Y candidate time sub-windows occupy discrete time-domain resources; the first radio signal is transmitted through a Physical Sidelink Shared Channel (PSSCH), the first radio signal carries both sidelink control information and transport block(s); the second information includes one or more fields in one System Information Block (SIB).

10. The first-type communication node according to claim 9, wherein the second information includes one bitmap, each bit in the bitmap represents one of the Y candidate time sub-window(s), each bit "1" in the bitmap indicates that a candidate time sub-window represented by the bit "1" is one of the W candidate time sub-window(s), and each bit "0" in the bitmap indicates that a candidate time sub-window represented by the bit "0" is a candidate time sub-window other than the W candidate time sub-window(s).

11. The first-type communication node according to claim 9, wherein each of the Y candidate time sub-window(s) is one slot, any two of the Y candidate time sub-windows have an equal time length, wherein the Y is greater than 1; the Y candidate time sub-windows occupy partial time-domain resources of a candidate time window among the X candidate time window(s) to which the Y candidate time sub-window(s) is belong.

12. The first-type communication node according to claim 9, wherein the first receiver receives third information, and the first transceiver transmits a first signaling; wherein the third information is used for determining the W1 time sub-window(s) out of the W candidate time sub-window(s) and frequency-domain resources occupied by the first radio signal, the first signaling is used for indicating the W1 time sub-window(s) and the frequency-domain resources occupied by the first radio signal, and the first signaling is transmitted via a first air interface.

13. The first-type communication node according to claim 12, wherein the third information is transmitted via an air interface, a time interval from a reception end time of the third information to a transmission start time of the first signaling has a time length not less than a first threshold, wherein the first threshold is related to a subcarrier spacing of a subcarrier occupied by the first radio signal; the third information includes part or all fields in one DCI signaling.

14. The first-type communication node according to claim 12, wherein the third information is transmitted via a second air interface, and the second air interface and the first air interface are a Uu interface and a PC5 interface respectively; the first signaling is transmitted through a PSCCH, the first signaling includes part or all fields in one SCI signaling.

15. The first-type communication node according to claim 9, wherein the first information includes a part of higher layer information and a part of physical layer information; or the first information includes one or more fields in one System Information Block (SIB).

16. The first-type communication node according to claim 9, wherein for a given subcarrier spacing of a subcarrier occupied by the first radio signal, the Y is further related to a length of a Cyclic Prefix (CP) of an OFDM symbol occupied by the first radio signal.

17. A second-type communication node for wireless communications, comprising:
a first transmitter, to transmit first information and second information;
wherein the first information is used for determining X candidate time window(s), any one of the X candidate time window(s) has a time length equal to a first time length, the first time length is fixed, and the X is a positive integer; a first radio signal is transmitted by a receiver of the first information in W1 time sub-window(s), the first radio signal is transmitted through sidelink; for a subcarrier spacing of a subcarrier occupied by the first radio signal, one of the X candidate time window(s) comprises Y candidate time sub-window(s), and the Y is related to the subcarrier spacing of the subcarrier occupied by the first radio signal; the second information is used for indicating W candidate time sub-window(s) out of the Y candidate time sub-window(s), the W is a positive integer, and the Y is a positive integer not less than the W; and each of the W1 time sub-window(s) is one of the W candidate time sub-window(s); the Y candidate time sub-windows occupy discrete time-domain resources; the first radio signal is transmitted through a Physical Sidelink Shared Channel (PSSCH), the first radio signal carries both sidelink control information and transport block(s); the second information includes one or more fields in one System Information Block (SIB).

18. The second-type communication node according to claim 17, wherein the second information includes one bitmap, each bit in the bitmap represents one of the Y candidate time sub-window(s), each bit "1" in the bitmap indicates that a candidate time sub-window represented by the bit "1" is one of the W candidate time sub-window(s), and each bit "0" in the bitmap indicates that a candidate time sub-window represented by the bit "0" is a candidate time sub-window other than the W candidate time sub-window(s).

19. The second-type communication node according to claim 17, wherein each of the Y candidate time sub-window(s) is one slot, any two of the Y candidate time sub-windows have an equal time length, wherein the Y is greater than 1; the Y candidate time sub-windows occupy partial time-domain resources of a candidate time window among the X candidate time window(s) to which the Y candidate time sub-window(s) is belong.

20. The second-type communication node according to claim 17, wherein the first transmitter transmits third information; wherein the third information is used for determining the W1 time sub-window(s) out of the W candidate time sub-window(s) and frequency-domain resources occupied by the first radio signal.

* * * * *